United States Patent
Stinson et al.

(10) Patent No.: US 11,242,272 B2
(45) Date of Patent: Feb. 8, 2022

(54) CONTINUOUS FLOW WASTEWATER TREATMENT SYSTEM

(71) Applicant: AECOM, Los Angeles, CA (US)

(72) Inventors: Beverley Stinson, Beltsville, MD (US); Giampiero Galvagno, Kelowna, CA (US); Keith Sears, Winnipeg (CA); Anthony Margevicius, Cleveland, OH (US)

(73) Assignee: AECOM, Los Angeles, CA (US)

( * ) Notice: Subject to any disclaimer, the term of this patent is extended or adjusted under 35 U.S.C. 154(b) by 127 days.

(21) Appl. No.: 16/455,289

(22) Filed: Jun. 27, 2019

(65) Prior Publication Data

US 2020/0002201 A1 Jan. 2, 2020

Related U.S. Application Data

(60) Provisional application No. 62/691,290, filed on Jun. 28, 2018.

(51) Int. Cl.
*C02F 3/30* (2006.01)
*C02F 3/28* (2006.01)
(Continued)

(52) U.S. Cl.
CPC .............. *C02F 3/30* (2013.01); *C02F 3/1221* (2013.01); *C02F 3/286* (2013.01); *C02F 3/308* (2013.01);
(Continued)

(58) Field of Classification Search
CPC .......... C02F 3/30; C02F 3/286; C02F 3/1221; C02F 2203/004; C02F 3/308; C02F 2003/001; Y02W 10/10
(Continued)

(56) References Cited

U.S. PATENT DOCUMENTS 5,288,405 A * 2/1994 Lamb, III ............... C02F 3/308
210/605
9,340,441 B2 5/2016 Conner et al.
(Continued)

FOREIGN PATENT DOCUMENTS

JP 2007136367 A † 6/2007
JP 2008284427 A † 11/2008
WO 2019195918 A1 † 10/2019

OTHER PUBLICATIONS

International Search Report and Written Opinion dated Oct. 24, 2019, for International Application No. PCT/US2019/039601, 20 pages.
(Continued)

*Primary Examiner* — Fred Prince
(74) *Attorney, Agent, or Firm* — Knobbe, Martens, Olson & Bear LLP

(57) ABSTRACT

A continuous flow wastewater treatment system is disclosed. The system can include a main processing circuit comprising an anoxic entry zone and an aerobic exit zone. The system can include a granule-producing sidestream incubator. The sidestream incubator can include an inlet that receives a first portion of return activated sludge (RAS) processed by the aerobic exit zone, a sidestream anoxic zone, and a sidestream anaerobic zone that cooperate to process the first portion of RAS. The sidestream incubator can include an outlet that delivers the processed first portion of RAS to the anoxic entry zone. The sidestream incubator can include a RAS bypass pathway that bypasses the granule-producing sidestream incubator to deliver a second portion of RAS processed by the aerobic exit zone to the anoxic entry zone. In some embodiments, the RAS and/or other fermentate can be step-fed into the sidestream incubator.

26 Claims, 14 Drawing Sheets

(51) Int. Cl.
*C02F 3/12* (2006.01)
*C02F 3/00* (2006.01)

(52) U.S. Cl.
CPC .. *C02F 2003/001* (2013.01); *C02F 2203/004* (2013.01); *Y02W 10/10* (2015.05)

(58) Field of Classification Search
USPC ....... 210/605, 623, 630, 259, 903, 906, 603, 210/631, 195.3
See application file for complete search history.

(56) References Cited

U.S. PATENT DOCUMENTS

| | | | |
|---|---|---|---|
| 9,670,083 B2 | 6/2017 | Wett et al. | |
| 9,828,262 B2* | 11/2017 | Blumenschein | C02F 1/5236 |
| 2003/0217968 A1 | 11/2003 | Goel et al. | |
| 2007/0051677 A1* | 3/2007 | Curtis | C02F 3/1221 |
| | | | 210/623 |
| 2007/0209998 A1* | 9/2007 | Abu-Orf | C02F 11/04 |
| | | | 210/624 |
| 2012/0152812 A1* | 6/2012 | Park | C02F 3/1221 |
| | | | 210/151 |
| 2014/0131272 A1* | 5/2014 | Josse | B30B 9/12 |
| | | | 210/605 |
| 2015/0076059 A1* | 3/2015 | Theodoulou | C02F 11/125 |
| | | | 210/608 |
| 2015/0376043 A1* | 12/2015 | Wett | C02F 3/28 |
| | | | 210/601 |
| 2016/0046509 A1 | 2/2016 | Ukai et al. | |
| 2017/0121197 A1 | 5/2017 | Tale | |

OTHER PUBLICATIONS

Faraj, R. et al., "The impact of applying an internal substrate selection strategy to improve aerobic granular sludge formation," WEFTEC 2017 Proceedings, 2017 Water Environment Federation, pp. 96-103.

Stevens, Gerry, "Optimizing BNR process using RAS anaerobic zone," AECOM, Westside Regional WWTP Operations Staff: Al Ellsworth, Mike Wyman, Angela Lambrecht, 8 pages. Date Unknown.

Sturm, B. et al., "Knowledge development forum: Balancing granular sludge with activated sludge systems for biological nutrient removal," WEFTEC 2017 Proceedings, 2017 Water Environment Federation, pp. 2664-2680.

Berends, et al., "Boosting nitrification with the BABE technology", Water Sci. & Tech, 52(4):63-70, 2005.†

Figdore, "Nitrification bioaugmentation in mainstream flocculent activated sludge systems using sidestream aerobic granular sludge", Dissertation, Univ. Wash., at i-ix, 1-40, https://digital.lib.washington.edu/researchworks/handle/1773/40865.†

* cited by examiner
† cited by third party

CONTINUOUS FLOW WASTEWATER TREATMENT SYSTEM

INCORPORATION BY REFERENCE TO PRIORITY APPLICATIONS

Any and all applications for which a foreign or domestic priority claim is identified in the Application Data Sheet as filed with the present application, including U.S. provisional application No. 62/691,290, filed Jun. 28, 2018, are hereby incorporated by reference under 37 CFR 1.57.

BACKGROUND

Field

The field relates to a continuous flow wastewater treatment system.

Description of the Related Art

Wastewater treatment plants (WWTPs) are directly impacted by increases in population, and hence by increases in pollutant flows and loads, and by changes in environmental regulations. Additionally, in WWTPs, it is often desirable to address factors such as reductions in operating costs, footprint, greenhouse gas emissions and the impact on the environment and the neighborhood. Existing wastewater utilities have shown a clear interest in cost-effective nutrient removal technology retrofits that can fit within an existing facility footprint. The demand is highest in metropolitan areas where high population growth, coupled with more stringent treatment requirements, has increased the demand on facilities and where the acquisition of new land comes at a premium. Treatment processes that rely on aerobic granular sludge (AGS) utilize treatment systems that are known to be significantly smaller in plan area than systems that utilize conventional activated sludge (CAS) or fixed film processes. AGS processes have the potential to meet future nutrient removal regulations and achieve capacity increases within existing treatment plant footprints with minimal infrastructure investment. AGS also offers reduced operating costs through reduced power requirements, which is of particular interest in high-energy-cost markets such as the Western United States of America (for example, California and the Hawaiian Islands), Europe, and Australasia. Currently, the only AGS product on the market is a sequencing batch reactor (SBR) process. Under the SBR configuration, wastewater fills a tank, displacing the effluent, the batch is aerated and allowed to settle, and the sequence is repeated. During the react and settling period of the process, which accounts for approximately 85% of the processing time, the flow to the WWTP must be stored in large holding tanks or directed to other reactors, which adds to both the amount of infrastructure required and the complexity of operation.

A continuous flow AGS process would allow for a number of benefits over batch operation. Firstly, a continuous flow AGS process are more compatible with both the infrastructure and operations of existing continuous flow WWTPs. The majority of WWTPs (more than 95%) in the world are continuous flow WWTPs. The few SBR WWTPs that exist are very small because each batch reactor can only handle a small amount of flow at a time. For example, in North America the largest SBR WWTP has a capacity to treat two million gallons per day (mgd) of wastewater. Most WWTPs are considerably larger, especially those in urban areas. For example, the Blue Plains WWTP in Washington D.C. has a dry weather design capacity of 390 mgd and a wet weather capacity of over 1.1 billion gallons per day. Similarly, the Stickney WWTP in Chicago has a maximum rated flow capacity of more than 1.4 billion gallons per day. Secondly, continuous flow processes are generally simpler to operate and control than sequential batch reactors which is also applicable to AGS processes. Since most plants currently operate in a continuous flow mode, the owners and operators are much more comfortable with the control strategies. Converting a continuous flow WWTP to a batch operation, especially at a large WWTP, would be challenging, especially since the SBR system cannot accept flow for most of the treatment cycle (e.g., can only accept flow during the fill cycle but not the react, settle and decant phase of the cycle). Furthermore, each step in the SBR process (fill, react, settle, decant) may utilize a separate control strategy.

However, controlling the conditions that provide for growth and retention of granular sludge is more challenging than for flocculent sludge in a continuous flow process, and has not been demonstrated in a full-scale facility. Accordingly, there remains a continuing need for improvements in continuous flow wastewater treatment systems.

SUMMARY

In one embodiment, a continuous flow wastewater treatment system is disclosed. The system can include a main processing circuit comprising an entry zone, a processing zone, and an exit zone. The system can include a sidestream incubator. The sidestream incubator can include an inlet that receives a first portion of return activated sludge (RAS) processed by the exit zone. The sidestream incubator can include a sidestream processing zone that processes the first portion of RAS. The sidestream incubator can include an outlet that delivers the processed first portion of RAS to the entry zone. A RAS bypass pathway can be provided to bypass the sidestream incubator to deliver a second portion of RAS to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include an inlet that receives return activated sludge (RAS) processed by the exit zone. The sidestream incubator can include a sidestream processing zone that processes the RAS. The sidestream incubator can include an outlet that delivers the processed RAS to the entry zone. The system can include a granule enhancing device in fluid communication with the sidestream incubator. The granule enhancing device can be configured to mix or to apply shearing forces to the RAS to enhance granule formation.

In another embodiment, a continuous flow wastewater treatment system is disclosed. The system can include a main processing circuit comprising an entry zone, a processing zone, and an exit zone. The system can include a sidestream incubator. The sidestream incubator can include an inlet that receives return activated sludge (RAS) processed by the exit zone. The sidestream incubator can include a sidestream anoxic zone and a plurality of sidestream anaerobic zones in fluid communication with the sidestream anoxic zone, the sidestream anoxic zone and the plurality of sidestream anaerobic zones cooperating to process the RAS. The sidestream incubator can include an outlet that delivers the processed RAS to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include a first inlet that receives return activated sludge (RAS) processed by the exit zone. The sidestream incubator can include a second inlet that receives imported substrate to react with the RAS. The sidestream incubator can include a sidestream processing zone that processes the RAS and the imported substrate. The sidestream incubator can include an outlet that delivers the processed RAS and imported substrate to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include a first inlet that receives return activated sludge (RAS) processed by the exit zone. The sidestream incubator can include a second inlet that receives a phosphorus-rich fluid stream. The sidestream incubator can include a sidestream processing zone that processes the RAS and the phosphorus-rich fluid stream. The sidestream incubator can include an outlet that delivers the processed RAS to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include a first inlet that receives a first portion of return activated sludge (RAS) processed by the exit zone. The sidestream incubator can include a sidestream processing zone that processes the first portion of RAS and the processed waste primary sludge. The sidestream incubator can include a granule retention device fluidly connected downstream of one or more of the exit zone of the main processing circuit and the sidestream processing zone, the granule retention device configured to retain granules. The sidestream incubator can include an outlet that delivers the processed first portion of RAS to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include an inlet that receives at least a first portion of return activated sludge (RAS) processed by the exit zone. The sidestream incubator can include a sidestream processing zone that processes the first portion of RAS, the sidestream processing zone comprising an aerobic processing zone. The sidestream incubator can include an outlet that delivers the processed first portion of RAS to the entry zone.

In another embodiment, a continuous flow wastewater treatment system is disclosed. The system can include a main processing circuit comprising an entry zone, a processing zone, and an exit zone. The system can include a sidestream incubator. The sidestream incubator can include an inlet that receives at least a first portion of return activated sludge (RAS) processed by the exit zone. The sidestream incubator can include a sidestream processing zone that processes the first portion of RAS, the sidestream processing zone comprising a RAS fermentation zone to ferment the RAS. The sidestream incubator can include an outlet that delivers the processed first portion of RAS to the entry zone.

In another embodiment, a continuous flow aerobic granular sludge wastewater processing system is disclosed. The system can include a main processing circuit comprising an anoxic entry zone, and an aerobic exit zone. The system can include a compact granule producing sidestream incubator. The sidestream incubator can include a feast condition zone created by a region having a high food-to-mass (F:M) ratio produced by introducing at least one of volatile fatty acids (VFAs) and readily biodegradable carbon (rbCODs). The sidestream incubator can include a famine condition zone having by a low F:M ratio region; wherein said sidestream incubator is disposed between the exit and entry zones.

In another embodiment, a continuous flow aerobic granular sludge wastewater processing system is disclosed. The system can include a main processing circuit comprising staged anaerobic zones and an aerobic exit zone. A robust feast region having a high food-to-mass (F:M) ratio can be created in an initial anaerobic zone by introducing only a portion of return activated sludge (RAS) and a majority or all of the raw influent or primary effluent. Successive introductions of portions of the RAS and a minority or no raw influent or primary effluent in subsequent staged anaerobic zones progressively can increase the F:M ratio and scavenge available substrate, thereby setting up a subsequent robust famine condition created by an extended aerobic zone wherein substrate is fully metabolized.

DETAILED DESCRIPTION

Figure 1:
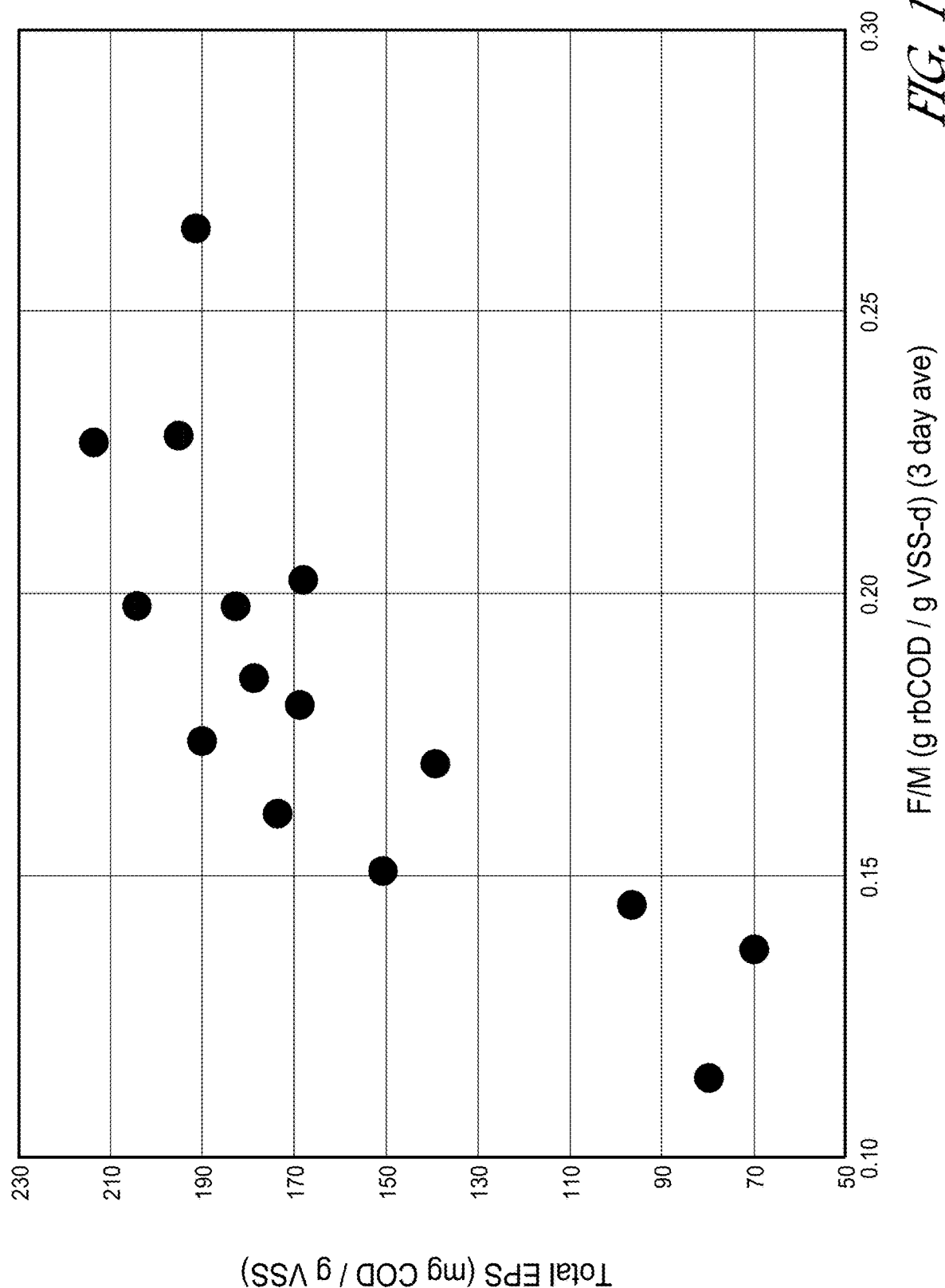
FIG. 1 is a graph showing a relationship between extracellular polymeric substances (EPS) production and food-to-mass (F:M) ratio.

The following description is provided to enable any person skilled in the art to make and use the embodiments disclosed herein and sets forth the best modes contemplated by the inventors of carrying out the disclosed embodiments. Various modifications, however, will remain readily apparent to those skilled in the art, since the general principles of the disclosed embodiments have been defined herein specifically to provide a continuous flow granular sludge waste water treatment process.

The Continuous Flow Granular Sludge (CFGS) process system described herein provides the several improvements to continuous granular sludge operations in a compact configuration. For example, various embodiments disclosed herein are configured to provide a feast condition in which the microorganisms are provided a soluble readily biodegradable carbon (rbCOD) and/or volatile fatty acid (VFA) rich environment that results in elevated extracellular polymeric substance (EPS) production. Various embodiments disclosed herein are also configured to provide a famine condition, in which the microorganisms enter a substrate limited environment, and that also results in improved EPS production. Various embodiments disclosed herein are also configured to provide a selective microorganism retention/wasting zone in which the larger and/or more dense biomass rich granules are selectively retained within the process, and in which the lighter, less dense flocculant microorganisms are wasted from the process.

The CFGS process described herein is based on the AECOM "Westbank" biological nutrient removal (BNR) process. In this process a dedicated zone or reactor can be provided to allow for contact between a concentrated stream of microorganisms, such as the Return Activated Sludge (RAS) stream, and a concentrated stream of rbCOD such as fermentate from a primary sludge fermentation process or other forms of carbon rich biodegradable substrate. This dedicated zone allows for a high Food: Microorganism (F:M) condition that can be controlled by altering the amount of the RAS flow and concentrated rbCOD stream that enters the bio-reactor. This zone is often referred to as a "sidestream" bioreactor (also referred to herein as a sidestream reactor or a sidestream incubator) because it does not receive the full flow of wastewater (either raw wastewater or primary clarified effluent wastewater) that conventional wastewater treatment processes receive. The sidestream reactor can be configured in many ways with multiple zones. In various embodiments, a reactor (e.g., the sidestream reactor) in which the concentrated microorganisms in the RAS and a concentrated substrate (e.g., rbCOD or ammonia- or phosphorus-rich substrates, depending on the type of granule to be formed) come into contact in a feast condition can beneficially promote CFGS in in various disclosed embodiments. The sidestream reactor disclosed herein provides for strong controlled feast conditions to complement the famine conditions in the mainstream bioreactor to achieve the feast-famine regime used for the development of aerobic granular sludge. In addition, a mechanism for "selective retention" of large and/or dense rapidly-settling particles or granules is also included in the process configuration to minimize the washout of granules. Various embodiments disclose several mechanisms that can help form and select for the more dense and/or larger diameter rapidly-settling granules, including lamella plates, cyclones, high rate settlers, and up-flow fluidized bed reactors, among others.

The dedicated or sidestream anaerobic zone can be fed a concentrated rbCOD source such as supernatant from a primary sludge fermenter to allow for controlled contact of the RAS with a concentrated source of rbCOD, specifically short chain volatile fatty acids (VFAs). The anaerobic zone and rbCOD rich substrate stream (e.g. fermenter supernatant, fermented RAS itself or other concentrated rbCOD stream) provides the feast conditions used for granular sludge formation. The famine conditions occur in the mainstream aerobic zone, which is downstream of the mainstream anoxic zone, after most of the soluble carbon is removed through anaerobic uptake and/or storage by the enhanced biological phosphorus removal (EBPR) organisms or denitrification in the anoxic zones. Specific oxygen uptake rate (SOUR) is monitored at the end of the aerobic zone to ensure a substantial amount of (e.g., most or all of) the soluble carbon has been consumed and the microbiology has entered endogenous respiration, indicating a famine or starvation condition.

A granule selector or granule retention device can be used to retain the denser and/or larger, faster settling granules, and allow for wasting of less dense, slower settling flocculent material. The granule selector may include a high rate settler with short retention time or configured with inclined lamella plates, a hydro-cyclone, a tube settler or up-flow fluidized bed reactor among others. The granule selector can be located on the surface wasting stream or waste activated sludge (WAS) stream to recover any granules that would otherwise be wasted out of the system or on the mixed liquor stream prior to the clarification units, or in multiple locations.

Various embodiments of the CFGS system and process utilize a sidestream anaerobic zone that allows for controlled contact of the RAS with a soluble carbon source and designed or optimized to provide for feast conditions. Various embodiments of the CFGS system and process also integrate a primary sludge fermenter and use VFAs in the supernatant as the soluble carbon source for feast conditions. Various embodiments of the CFGS system and process also introduce a rapidly settling sludge or granule selector as part of the sludge wasting process to improve or maximize retention of faster settling sludge.

An important factor in the formation of compact sludge granules with structural integrity is the production of extracellular polymeric substances (EPS) that assists in the agglomeration of microorganisms into a compact dense granule. EPS production is encouraged in microorganisms under both a feast and a famine or starvation phase. In the feast condition, the availability of high concentrations of substrate relative to the microorganism mass (food:microorganism mass ratio, or F:M ratio) to encourage increased production of EPS. The food in the F:M ratio is measured as readily biodegradable carbon (rbCOD) whereas the microbial mass is measured as volatile suspended solids concentration per day (VSS-d). Achieving a compact granule with structural integrity depends significantly on the EPS content. EPS content is directly related to the F:M ratio in a feast condition. In a feast condition, EPS production is directly associated with substrate consumption—the higher substrate consumption, the greater the EPS production. In a famine condition, EPS production occurs when the microorganism is lacking sufficient substrate and begins to enter into endogenous respiration. Increased production of EPS can beneficially improve agglomeration of micro-organisms into larger, heavier groups of micro-organisms or granules, and agglomeration is aided by increased contact between the EPS rich microorganisms. Such granules can settle rapidly, improving the efficiency of wastewater treatment systems.

Figure 2:
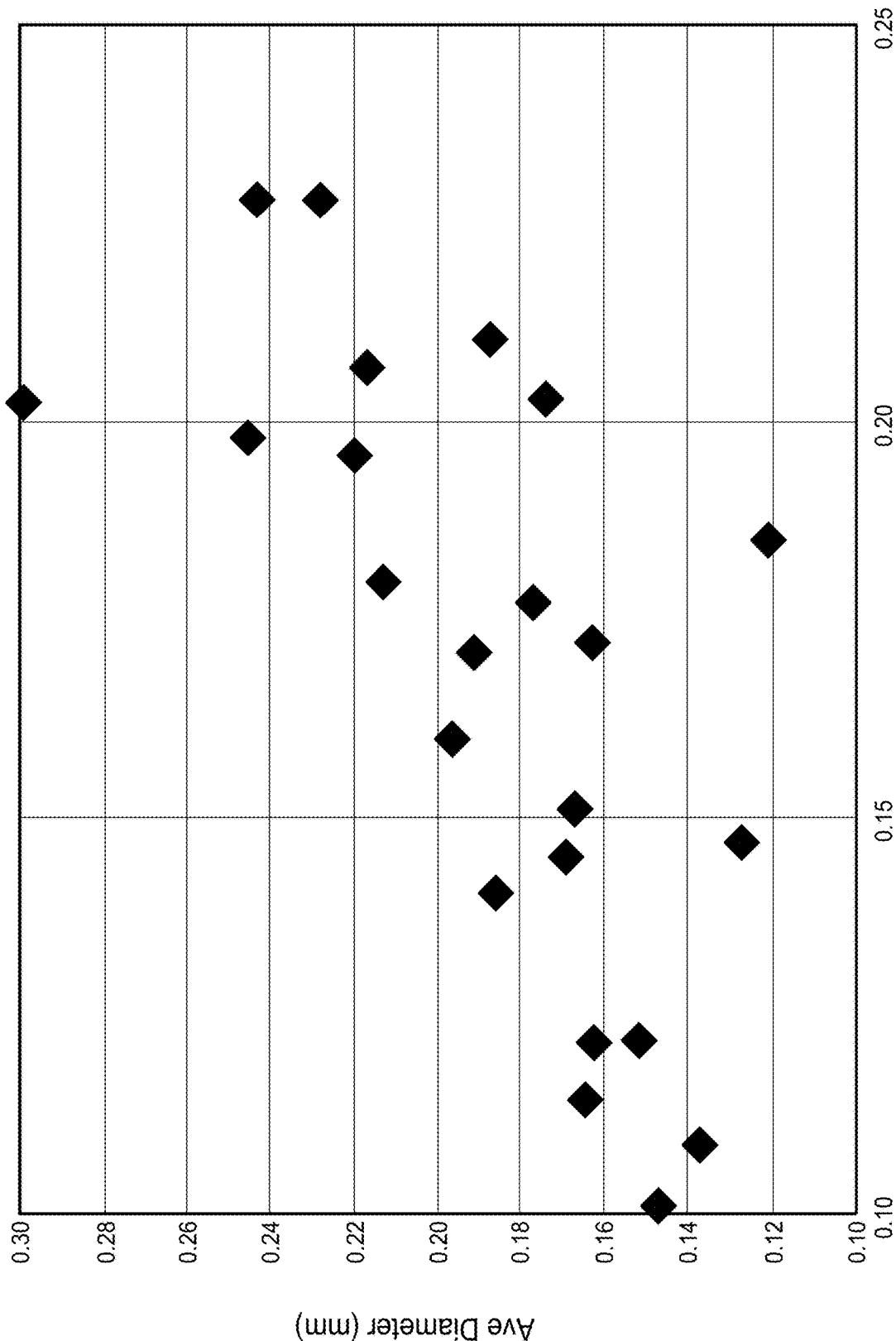
FIG. 2 is a graph showing a relationship between granule size and F:M ratio.

The impact of manipulating F:M ratio through daily wasting was investigated over a four-month period in a sequencing batch reactor system. See Impact of Substrate Availability In Terms of F:M Availability On Total EPS Content in Sludge. Sturm et al., Water Environment Federation 2017 Proceedings. At the beginning of the study the F:M ratio was 0.12±0.02 g rbCOD/VSS-d, where rbCOD represents readily biodegradable Chemical Oxygen Demand; VSS-d represents the average Volatile Suspended Solids concentration for the day, i.e., the biologically active portion of the biomass. The food in the F:M ratio is measured as rbCOD whereas the microbial mass is measured as VSS-d. At this point, the sludge (biomass) was primarily flocculent with only 10%-14% of the total suspended solids (TSS) settling at a rate greater than 9 m/hr., as measured by the intrinsic settling classes (ISC) test. The average granule diameter at the beginning of the study was 0.15±0.25 mm. As the F:M ratio gradually increased from 0.12 to 0.23 g rbCOD/g VSS-d, the average particle diameter of the sludge increased from 0.15±0.25 to 0.25±0.39 mm, as shown in FIG. 2. Granules are discrete particles that settle quickly without the need for bioflocculation. In the literature, granules have been defined as having a critical settling velocity of 10 m/hr or more, (see A unified theory for upscaling aerobic granular sludge sequencing batch reactors, Liu et al., Biotechnology Advances 23(5), 2005) or having a particle diameter greater than 0.2 mm (see Aerobic granular sludge, Bathe et al., IWA Publishing, 2005). ISC test results of at least 9 m/hr. are also indicative of the presence of granules.

Figure 3:
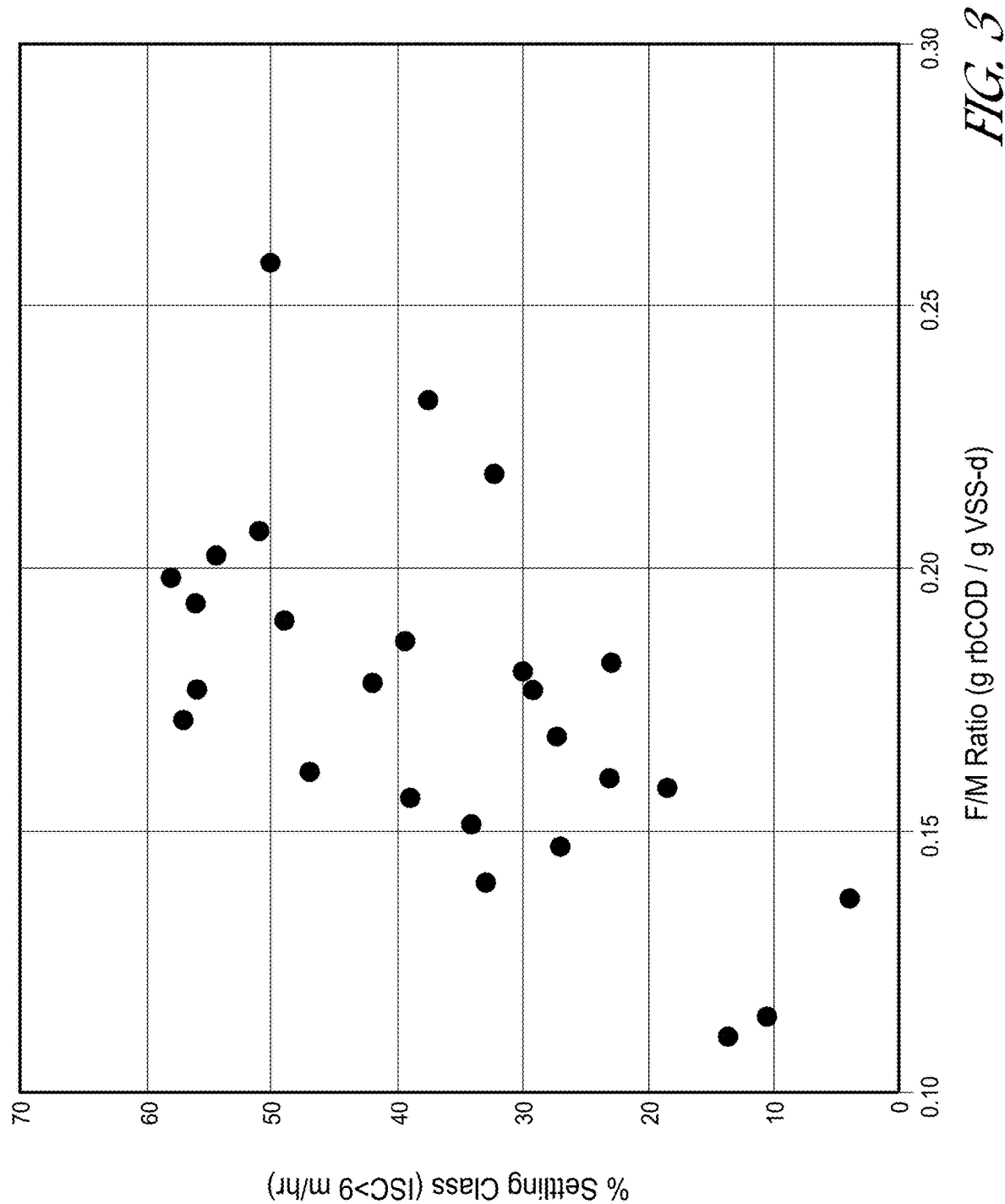
FIG. 3 is a graph showing a relationship between granule settling class and F:M ratio.

Experimental data indicate that when the F:M ratio is above 0.2 (rbCOD)/(VSS-d) it encourages greater EPS production and subsequent granule formation. FIG. 1 confirms that actual measurement of total EPS production approaches an asymptote at an F:M ratio of 0.2. See Impact of Substrate Availability In Terms of F:M Availability On Total EPS Content in Sludge. Sturm et al., Water Environment Federation 2017 Proceedings. FIG. 2 shows that the desired minimum granule size is achieved as an F:M ratio of 0.2 is reached. See Response of Average Sludge Particle Diameter to Average F:M Ratio. Faraj, R. et.al. Water Environment Federation 2017 Proceedings. FIG. 3 shows that the percentage of rapidly settling granules increases with increasing F:M ratio. See Effect of F:M Ratio On Granule Formation Based On Intrinsic Settling Velocity Class (ISC) >9 m/hr. Sturm et al., Water Environment Federation 2017 Proceedings.

Figure 4:
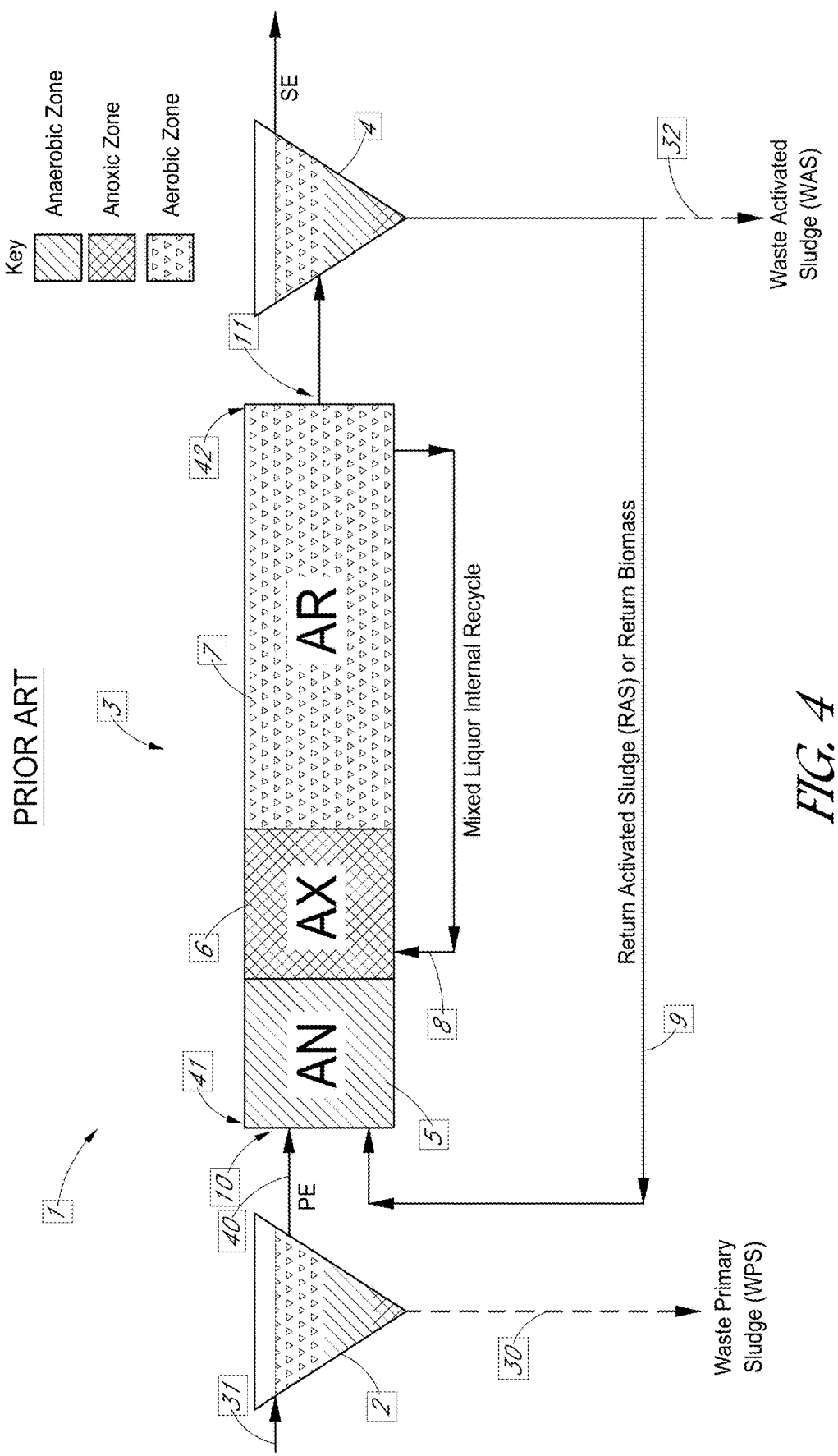
FIG. 4 is a diagram showing a PRIOR ART A2O enhanced biological phosphorus removal (EBPR) conventional activated sludge (CAS) process.
Figure 5:
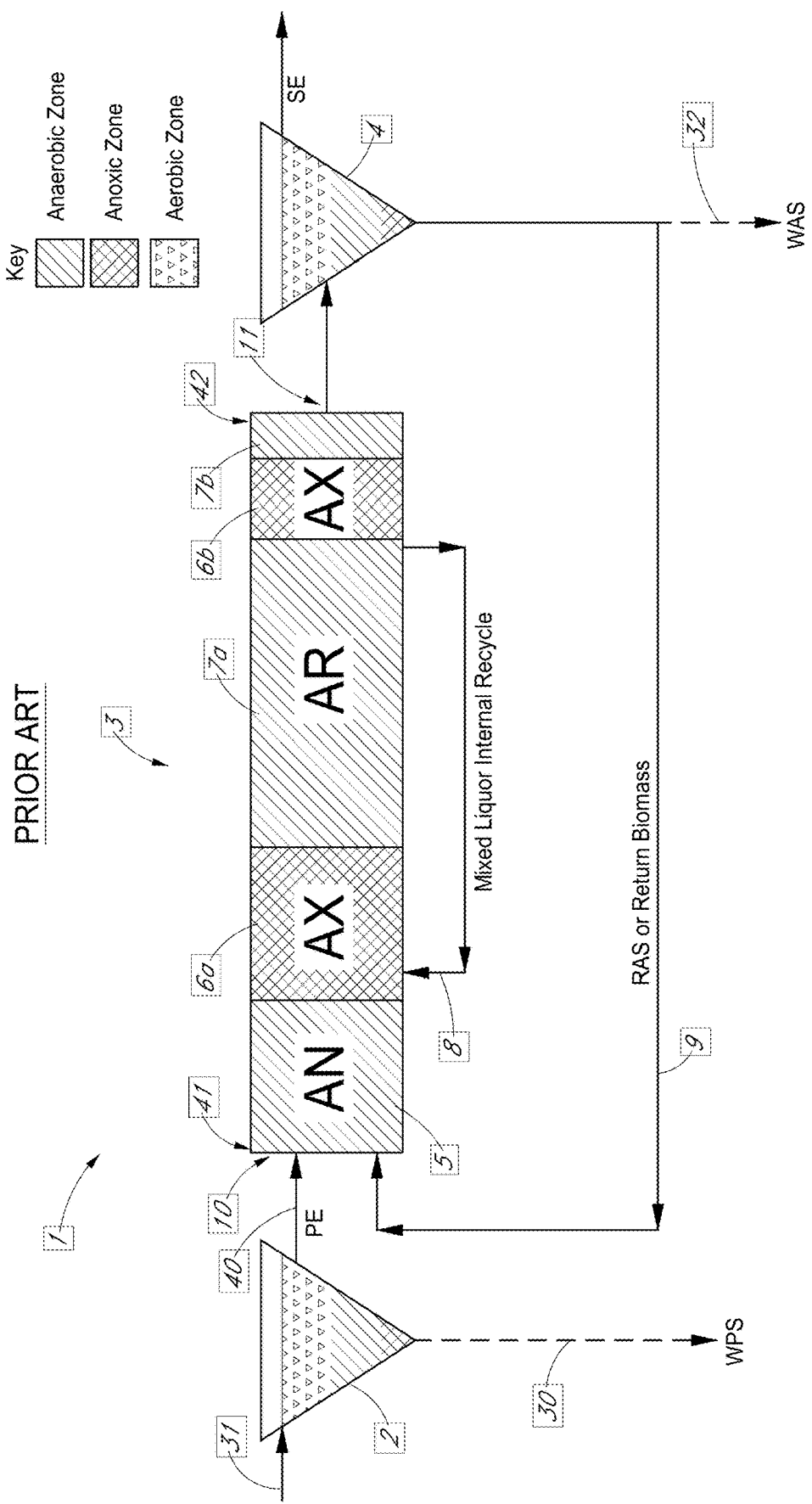
FIG. 5 is a diagram showing a second PRIOR ART 5-stage Bardenpho EBPR CAS process.

Granule formation with the Continuous Flow Aerobic Granular Sludge (CFAGS) processes and systems disclosed herein provides various improvements over prior concepts shown in FIGS. 4 and 5. FIG. 4 shows a wastewater treatment system 1 that includes a main wastewater processing circuit 3 that includes an entry zone 41 that comprises an anaerobic entry zone 5, an anoxic zone 6 downstream of the anaerobic entry zone 5, and an exit zone 42 that comprises an aerobic exit zone 7 downstream of the anoxic zone 6. Wastewater (e.g., raw influent wastewater or primary effluent (PE)) can be supplied to the anaerobic entry zone 5 of the main wastewater processing circuit 3. In various embodiments, the system 1 can include a primary clarifier 2. In other embodiments, the system 1 may not include any primary clarifiers. In the illustrated embodiment, for example, the primary clarifier 2 can supply PE to the main processing circuit 3 from an influent wastewater source 31. In other embodiments (for example, that do not include a primary clarifier), influent wastewater can be provided to the main processing circuit 3 directly from an influent wastewater source 31. The wastewater can include soluble Chemical Oxygen Demand (COD), volatile fatty acids (VFAs), and particulate organics. The wastewater can enter the main processing circuit 3 by way of a main processing circuit inlet 10 along an influent line 40. In systems with primary clarifiers, PE can be supplied to the main processing circuit 3 along the influent line 40. In other embodiments in where there is no primary clarifier, raw influent wastewater can be supplied to the main processing circuit 3 along the influent line 40. In systems with primary clarifiers 2, waste primary sludge (WPS) 30 can be removed from the primary clarifier 2.

In the anaerobic entry zone 5, the EBPR micro-organisms in a RAS return line 9 can release stored phosphorus (P) and can take up carbon (C). The anaerobic zone 5 operates best when there is no free or dissolved Oxygen (O), or bound oxygen such as in the form of nitrates and nitrites. Long-chain carbon compounds can be converted to short-chain carbon compounds, which can be more easily taken up by the EBPR micro-organisms. The wastewater can pass into the anoxic zone 6, in which denitrification occurs to remove the nitrite and nitrate nitrogen (N) in the form of gaseous nitrogen from the wastewater. The wastewater can subsequently pass into the aerobic exit zone 7, in which ammonia is nitrified in the wastewater. As shown in FIG. 4, a first portion of the treated wastewater can be transferred from an outlet 11 of the main wastewater processing circuit 3 along a mixed liquor internal recycle line 8 to return to the anoxic zone 6. A second portion of the treated wastewater can be transferred from the outlet 11 to a secondary clarifier 4, in which solid particles or suspended solids (including microorganisms) can settle and thicken, and a portion of the thickened solids can be removed or wasted from the system 1 as Waste Activated Sludge (WAS) along WAS line 32.

A first portion of wastewater from the secondary clarifier 4 can be transferred to other systems as secondary effluent (SE) for additional treatments and removal of contaminants or discharged from the WWTP. A second portion of wastewater from the secondary clarifier 4 can be removed from the system 1 as WAS along WAS line 32. A third portion of wastewater from the secondary clarifier 4 can be returned to the inlet 10 of the main processing circuit 3 as Return Activated Sludge (RAS) or Return Biomass along the RAS line 9.

FIG. 5 illustrates another variant of a wastewater treatment system 1, which may be generally similar to the system 1 of FIG. 4. Unless otherwise noted, the components of FIG. 4 may be the same as or generally similar to like-numbered components of FIG. 4. Unlike the system 1 of FIG. 4, in FIG. 5, the main wastewater processing circuit 3 can include a plurality of anoxic zones 6a, 6b and a plurality of aerobic zones 7a, 7b. As shown in FIG. 5, a first anoxic zone 6a can be disposed downstream of the anaerobic entry zone 5. A first aerobic zone 7a can be located downstream of the first anoxic zone 6a. A second anoxic zone 6b can be located downstream of the first aerobic zone 7a, and a second aerobic zone 7b can be located downstream of the second anoxic zone 6b. Thus, the main processing circuit 3 can include alternating anoxic and aerobic zones to improve processing capabilities. Any suitable number of anoxic and aerobic zones can be used.

The systems 1 of FIGS. 4 and 5 can have several drawbacks. For example, the systems 1 of FIGS. 4 and 5 include a dilute anaerobic entry zone 5, which can undesirably increase the size of the tank volume used in the system 1. Further, organic materials are fermented to VFAs in the anaerobic zone 5 before the EBRP organisms can take them up, which also entails use of a larger volume tank. In the arrangement of FIGS. 4 and 5, varying the oxygen reduction potential (ORP) and/or the anaerobic conditions (Nitrate/Nitrite (NOx) or Dissolved Oxygen (DO) intrusion) can result in less desirable performance. Accordingly, there remains a continuing need for improved wastewater treatment systems.

Figure 6:
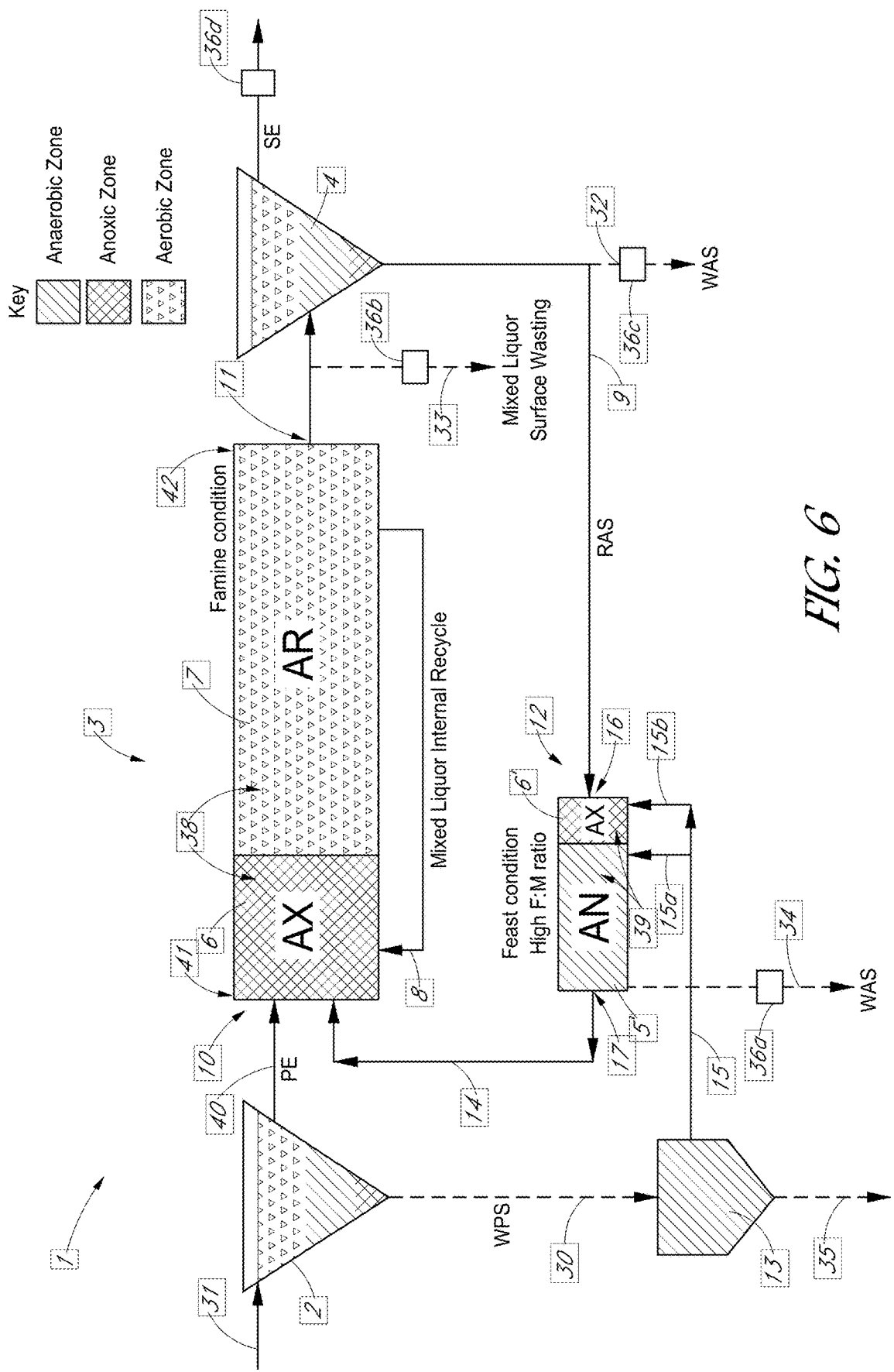
FIG. 6 shows a system diagram of a continuous flow granular sludge (CFGS) system and process including a sidestream reactor according to various embodiments.

In the CFGS process of the disclosed embodiments, granules are formed in a feast-famine regime that can be optimized or improved through a number of control features such as one or more reactors where there is an elevated and controllable F:M ratio, the introduction of mixing forces by one or more mixing devices to enhance microbial agglomeration in granules, and an improved rate of substrate uptake. FIG. 6 illustrates an embodiment in which a sidestream reactor or incubator 12 is provided along the RAS return line 9. Unless otherwise noted, the components of FIG. 6 may be the same as or generally similar to like-numbered components of FIGS. 4-5. FIG. 6 shows an embodiment of the CFGS process in which the granules are formed in the separate "sidestream" reactor 12 or incubator (which can comprise a tank), and not solely in a mainstream wastewater treatment reactor/tank, e.g., not entirely within the main processing circuit 3. As shown in FIG. 6, for example, the sidestream reactor or incubator 12 may not treat or hydraulically process the main wastewater flow. The sidestream reactor 12 can receive some main wastewater flow as a source of additional substrate but it is not intended to treat the mainstream wastewater flow. Rather one purpose of the sidestream reactor 12 is to serve as a concentrated zone in which the microorganisms in the RAS can be manipulated or pre-treated to enhance the growth rates, kinetics, dominance in the microbial population or to express other reactions such as phosphorus release, rbCOD storage, EPS production and more. In this embodiment, the sidestream reactor 12 can be part of the main activated sludge tank structure (which can also include the main processing circuit 3) but most or all of the mainstream wastewater bypasses the dedicated RAS zone or reactor 12. In other embodiments, the sidestream reactor 12 can be provided in one or more tanks that are physically separate from the tank(s) that define the main wastewater processing circuit 3. The process does not rely on raw wastewater influent or Primary Effluent (PE) as the principal substrate source to drive the EBPR process as shown in FIGS. 6-13B. However, in some embodiments, adding a portion of wastewater PE to the RAS or sidestream reactor 12 as a supplemental substrate source may be suitable and is not precluded.

The mainstream processing circuit 3 can include a mainstream processing zone 38 configured to process influent liquid, e.g., raw influent wastewater or primary effluent. In the embodiment of FIG. 6, the processing zone 38 includes an anoxic entry zone 6 and an aerobic exit zone 7, but in other embodiments, the processing zone 38 may include other types of processing zones (see, e.g., FIGS. 13A-13B).

In FIG. 6, the sidestream reactor or incubator 12 can be located along the RAS return line 9. A sidestream inlet 16 can receive at least a portion of the RAS processed by the aerobic exit zone 7 of the main wastewater processing circuit 3. The sidestream reactor 12 can include a sidestream processing zone 39 configured to process at least a portion of the RAS. The sidestream processing zone 39 of the sidestream incubator 12 can include a sidestream anoxic zone 6' and a sidestream anaerobic zone 5' downstream of the sidestream anoxic zone 6'. In other embodiments, however, the sidestream processing zone 39 can include other types of processing zones (see, e.g., FIGS. 13A-13B). The sidestream anoxic zone 6' can be configured such that dissolved oxygen (DO), nitrates and nitrites are removed from the flow. The sidestream anaerobic zone 5' can operate as an anaerobic zone to process the portion of the RAS delivered to the inlet 16. A sidestream outlet 17 can deliver the processed portion of the RAS to the entry zone 41 (e.g., an anoxic entry zone 6) of the main wastewater processing circuit 3 along an outlet line 14. As shown in FIG. 6, the main circuit 3 need not include an anoxic or anaerobic entry zone, unlike conventional EBPR systems as shown in FIGS. 4 and 5.

Furthermore, as shown in FIG. 6, waste primary sludge (WPS) can be transferred from the primary clarifiers 2 to a WPS processing device 13, such as a gravity thickener or fermenter, to thicken and/or ferment the WPS to form short chain rbCOD compounds such as Volatile Fatty Acids (VFAs) in liquid supernatant from the WPS processing device 13. The rbCODs (e.g., supernatant) can be transferred from the WPS processing device 13 to the sidestream reactor 12 along sidestream supply line 15, and can be mixed with the RAS in the sidestream reactor 12 to provide a feast condition and initiate the granule formation process. The supernatant from the WPS processing device 13 is an example of a concentrated source of rbCOD and can include Gravity Thickener Overflow (GTO), fermentate rich in VFAs and/or fermenting organisms, and/or other forms of concentrated rbCOD or VFAs, including chemicals sourced from outside the system 1 or rbCOD rich waste by-products. The concentrated rbCOD rich substrate stream from the WPS processing device 13 can be delivered to one or more secondary inlets of the sidestream incubator 12 by way of sidestream supply line 15. For example, a first portion of the rbCOD rich substrate can be delivered to the sidestream anaerobic zone 5' along a first supply line 15a. A second portion of the rbCOD rich substrate can be delivered to the sidestream anoxic zone 6' along a second supply line 15b. In various embodiments, the first and second supply lines 15a, 15b can deliver the first and second portions of rbCOD rich substrate to the anaerobic and anoxic zones 5', 6', respectively, in parallel, such that the first and second portions of rbCOD rich substrate are delivered simultaneously to the anaerobic and anoxic zones 5', 6'. As shown in FIG. 6, thickened WPS can be transferred away or wasted from the system 1 along a waste line 35.

In the embodiment of FIG. 6, a more concentrated substrate source (rbCOD) in the form of VFA supplied from the WPS processing device 13 provides an improved form of substrate for granule formation and the sidestream reactor 12 provides a more stable and improved environment (more stable anaerobic conditions with a lower ORP; less DO, nitrite and nitrate intrusion to upset the anaerobic conditions; a more consistent temperature; and a more stable and controllable hydraulic retention time (HRT) and sludge retention time (SRT)) when compared to the conventional configurations of FIGS. 4-5. Furthermore, configuration in FIG. 6 results in a smaller overall treatment volume and footprint by comparison to the CAS treatment configurations as shown in FIGS. 4 & 5 because the sidestream reactor operates under more concentrated conditions both in terms of the microbial mass (operating on concentrated RAS rather than the dilute blend of RAS and wastewater (referred to commonly as Mixed Liquor suspended solids (MLSS) which can be at least 25% less concentrated), and substrate (for example fermentate from the WPS processing device 13 or similar). As a result, the embodiment of FIG. 6 provides an improved F:M ratio for granule formation, e.g., including F:M ratios at least 0.15 (rbCOD: VSS), or at least 0.2 (rbCOD:VSS), all within a smaller footprint. This is shown diagrammatically in FIG. 6. As shown in FIG. 6, multiple sources of concentrated VFA substrates from the WPS processing device 13 may be utilized such as Gravity Thickener Overflow (GTO), and/or fermentate produced from the fermentation of waste primary sludge (WPS) and/or waste activated sludge (WAS). In some embodiments, waste activated sludge can be withdrawn from the sidestream reactor 12 after dissolved ortho-phosphorus (OP) has been released in the anaerobic zone. This waste can be processes to facilitate phosphorus recovery processes while avoiding struvite precipitation in the digesters. Beneficially, providing additional fermentate from the WPS processing device 13 in combination with the concentrated RAS can improve the efficiency of the wastewater treatment process within a small footprint.

In addition, the embodiment of FIG. 6 beneficially includes one or more granule retention devices 36a-36d configured to retain denser granules and recirculate them into the system 1. The granule retention devices 36a-36d can comprise any suitable type of granule retention device, including, for example, lamella plates. The granule retention devices 36a-36d can be configured to retain faster settling granules (e.g., denser granules), while removing or wasting out the lightly settling granules. The retained dense granules can be reintroduced into the system 1 at any suitable influent flowpath.

For example, a first granule retention device 36a can be provided along the WAS line 34 that conveys WAS away from the sidestream reactor 12. The first granule retention device 36a can be configured to collect or retain dense granules in WAS that has been processed by the sidestream reactor 12. Similarly, a second granule retention device 36b can be disposed along a surface wasting line 33 that draws mixed liquor from a conduit received effluent liquid from the outlet 11. A third granule retention device 36c can be disposed along WAS line 32 that conveys WAS away from the secondary clarifier 4. A fourth granule retention device 36d can be disposed downstream of the secondary clarifier 4 along a conduit that receives secondary effluent (SE) from the clarifier 4 to retain dense granules present in the SE.

The granules retained by the granule retention devices 36a-36d can be returned to the system 1 at any suitable location. For example, in some embodiments, the granules retained by the granule retention devices 36a-36d can be returned to the system 1 along a granule delivery line to deliver the retained granules to the entry zone 41 of the mainstream processing circuit 3, the RAS return line 9, the supply lines 15a, 15b, the mixed liquor internal recycle line 8, or any other suitable line through which liquid enters a processing zone of the mainstream circuit 3 or the sidestream reactor 12.

Accordingly, in the illustrated embodiment of FIG. 6, the granule retention devices 36a-36d can be used to retain and recirculate large, dense granules that would be wasted away in other systems. The granule retention devices 36a-36d can be provided in any of the embodiments disclosed herein. However, some embodiments may not utilize the granule retention devices 36a-36d. Moreover, although four granule retention devices 36a-36d are shown in FIG. 6, it should be appreciated that any suitable number of granule retention devices may be provided. For example, the granule retention devices may be provided on only a subset of the effluent lines shown in FIG. 6.

Figure 7:
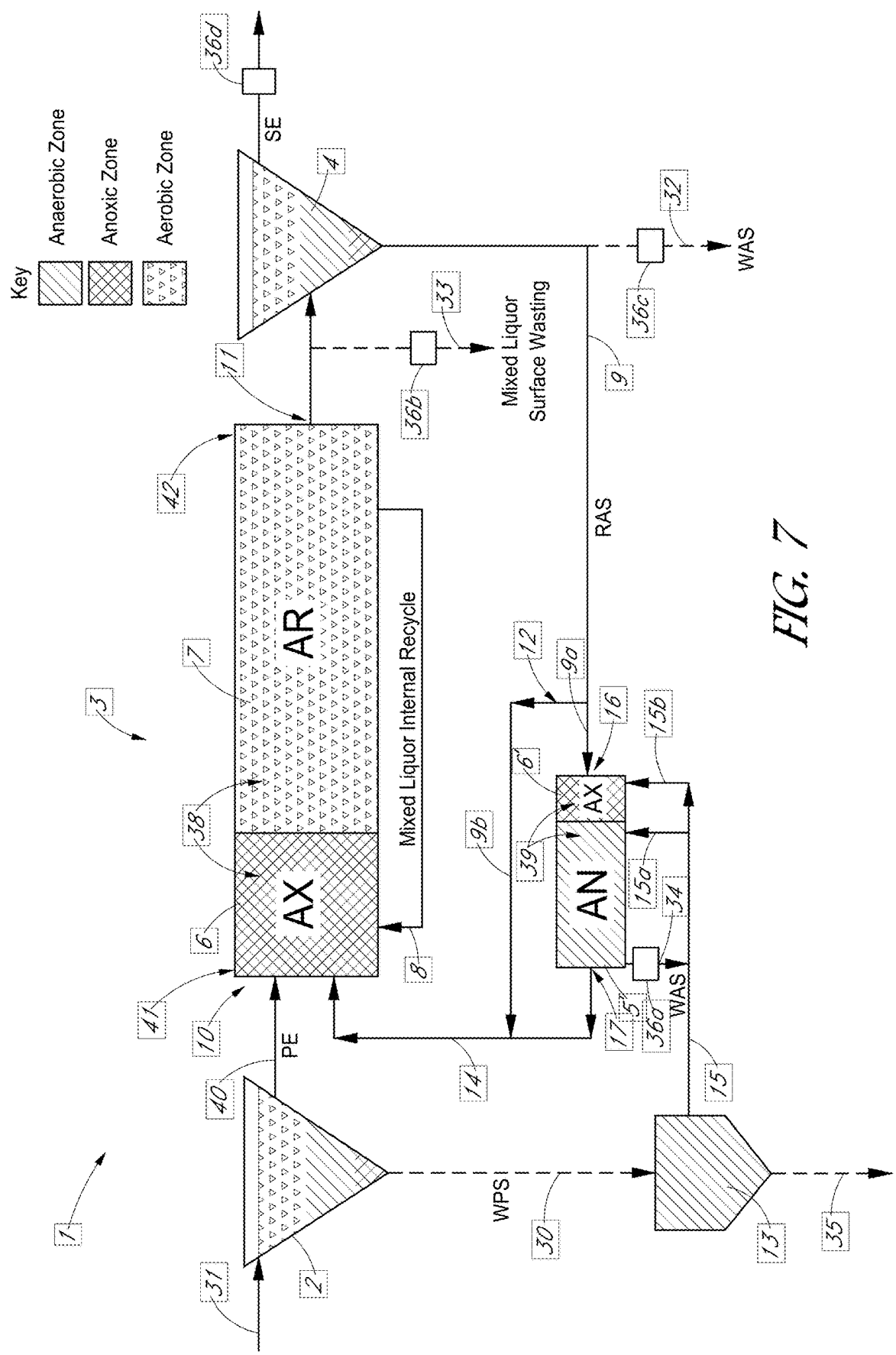
FIG. 7 is a system diagram of the embodiment of FIG. 6 with a portion of the return activated sludge (RAS) bypassing the sidestream reactor.

FIG. 7 shows the addition of a RAS bypass line 9a to the FIG. 6 configuration to enhance and control the rbCOD:VSS ratio. Unless otherwise noted, the components of FIG. 7 may be the same as or generally similar to like-numbered components of FIGS. 4-6. As with FIG. 6, the system 1 of FIG. 7 includes the sidestream reactor or incubator 12. A first portion of the RAS can be supplied from the RAS return line 9 to the inlet 16 of the sidestream reactor 12 along a RAS supply pathway 9a. Unlike the embodiment of FIG. 6, however, a second portion of the RAS can be diverted upstream of the sidestream reactor 12 so as to bypass the sidestream reactor 12 along the RAS bypass pathway 9b. The RAS bypass pathway 9b can accordingly be routed around the sidestream reactor 12 and can join the outlet line 14 downstream of the sidestream reactor 12 to be entrained with the processed sludge that returns to the entry zone 41 (e.g., anoxic entry zone 6) of the main processing circuit 3.

In the embodiment of FIG. 7, the first portion of the RAS supplied to the sidestream incubator 12 can be in the range of 0% to 100%, in a range of 5% to 80%, in a range of 5% to 50%, in a range of 5% to 35%, in a range of 5% to 25%, or in a range of 10% to 30% of the total amount of RAS delivered along the RAS return line 9. In various embodiments, at least 20%, at least 30%, or at least 40%, of the total amount of RAS can be delivered along the RAS return line 9. The remainder of the RAS can bypass the reactor 12 along the bypass pathway 9b. In various embodiments, as little as 20% of the RAS can be supplied to the sidestream incubator 12. Even though a minority of the RAS may be supplied to the sidestream incubator 12, that first portion of the RAS can react with 100% of the rbCOD rich substrate such as the fermentate supplied by the WPS processing device 13, leading to a higher F:M ratio in the sidestream reactor 12 and reducing the overall size of the system 1. The RAS bypass pathway 9b provides the flexibility to achieve better control of the conditions in the sidestream reactor 12 such as SRT, HRT, temperature, concetrations and ORP, that can enhance overall reaction rates. For example, in colder seasons or climates, a different proportion of the RAS can be delivered to the sidestream reactor 12 relative to warmer seasons or climates to improve overall performance of the EPS production and granule formation.

Figure 8:
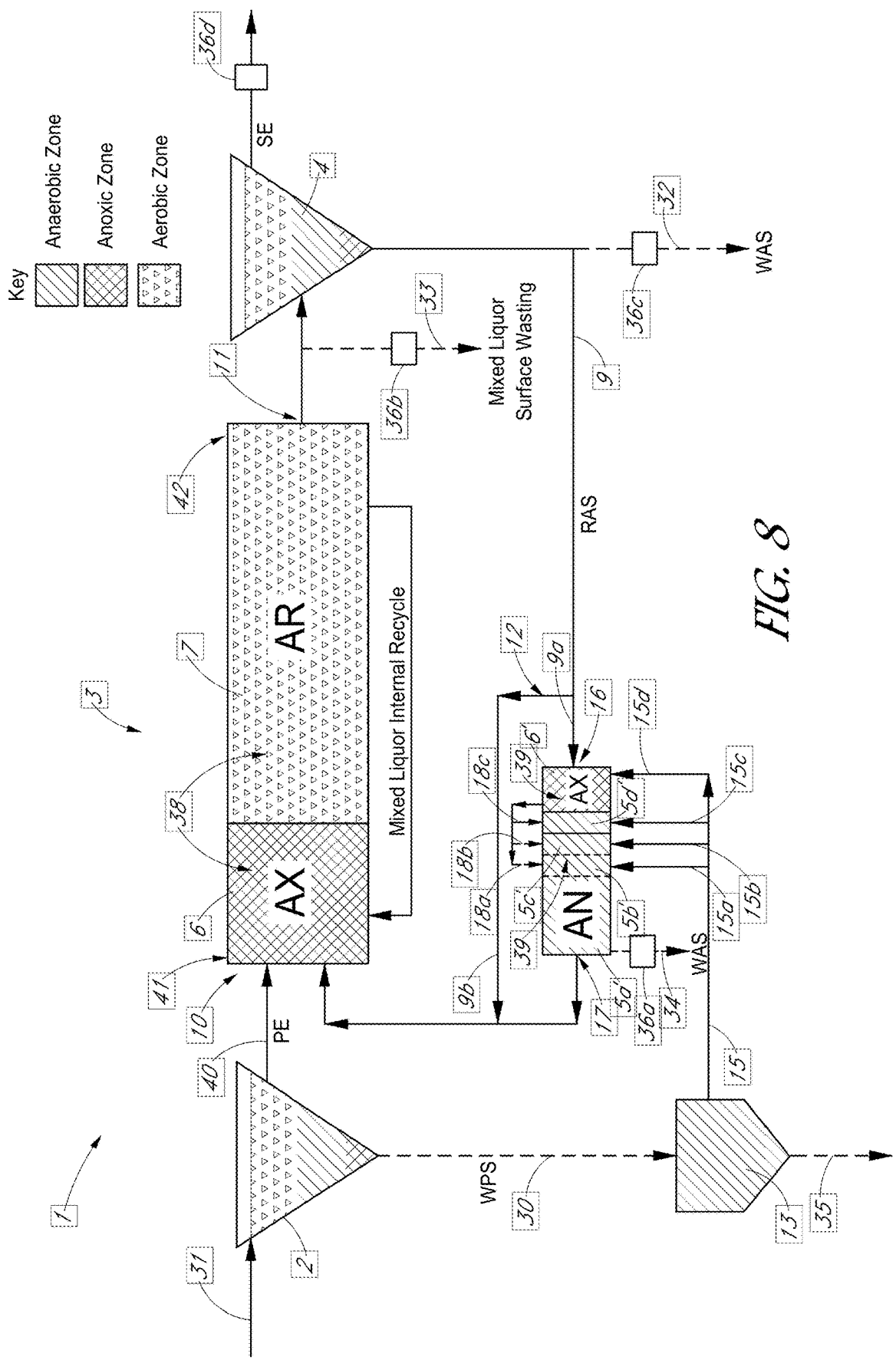
FIG. 8 is a system diagram illustrating the step-feeding of the RAS and volatile fatty acids (VFA) to the sidestream reactor, according to various embodiments.

FIG. 8 shows an additional embodiment of the system 1 in the RAS and/or the rbCOD rich substrate Y (e.g., GTO and/or fermentate, purchased chemicals or other rbCOD rich waste products) processed by the WPS processing device 13 can be step fed into the sidestream incubator 12. Unless otherwise noted, the components of FIG. 8 may be the same as or generally similar to like-numbered components of FIGS. 4-7. Unlike the embodiment of FIG. 7, the sidestream anaerobic zone can comprise a plurality of anaerobic sub-zones 5a'-5d'. Although four anaerobic sub-zones 5a'-5d' are shown in FIG. 8, any suitable number of anaerobic subzones can be provided.

The rbCOD rich substrate (e.g., fermentate or GTO) from the WAS processing device 13 can be step-fed into the sidestream anoxic zone 6' and into the respective sidestream anaerobic sub-zones 5a'-5d' along respective supply lines 15a-15d. In various embodiments, the rbCOD rich substrate can be supplied in parallel (e.g., substantially simultaneously) to the sidestream anoxic zone 6' and the sidestream anaerobic sub-zones 5a'-5d'. In various embodiments, portions of the rbCOD rich substrate from the WAS processing device 13 can pass serially through the anoxic zone 6' and through the anaerobic sub-zones 5a'-5d'.

Further, the first portion of the RAS from the RAS return line 9 can enter the sidestream anoxic zone 6' through the inlet 16 along the RAS supply pathway 9a. The second portion of the RAS from the return line 9 can be diverted around the sidestream incubator 12 through the bypass pathway 9b. Portions of the RAS can be step fed to the sidestream anaerobic sub-zones 5b'-5d' through respective step pathways 18a-18c.

In various embodiments, the step-fed RAS through the step pathways 18a-18c and the step-fed rbCOD rich substrate (e.g., fermentate) through the supply lines 15a-15d can beneficially improve the controllability and efficiency of the treatment process. In various embodiments, the use of separate anaerobic sub-zones 5a'-5d' and step-feeding of rbCOD rich substrate and RAS can allow for independent control of oxidation reduction potential (ORP), F:M ratio, SRT and HRT. Each sub-zone 5a'-5d', and the amount of rbCOD rich substrate and/or RAS supplied to the sub-zones 5a'-5d' and the anoxic zone 6', can be adjusted to achieve the desired operating conditions to improve the process performance and granule formation. Moreover, the fluid pathways through and between the sub-zones 5a'-5d' and the anoxic zone 6' can be designed in a serpentine manner so as to increase residence time to improve controllability and efficiency. Baffles and other internal structures in the tank(s) can be provided to control concentrations gradients and the response of micro-organisms in order to further control the treatment process. For example, the anaerobic sub-zones 5a'-5d' can be partitioned from one another by baffled walls to enable high contact concentrations and residence times for improved controllability and efficiency.

Figure 9:
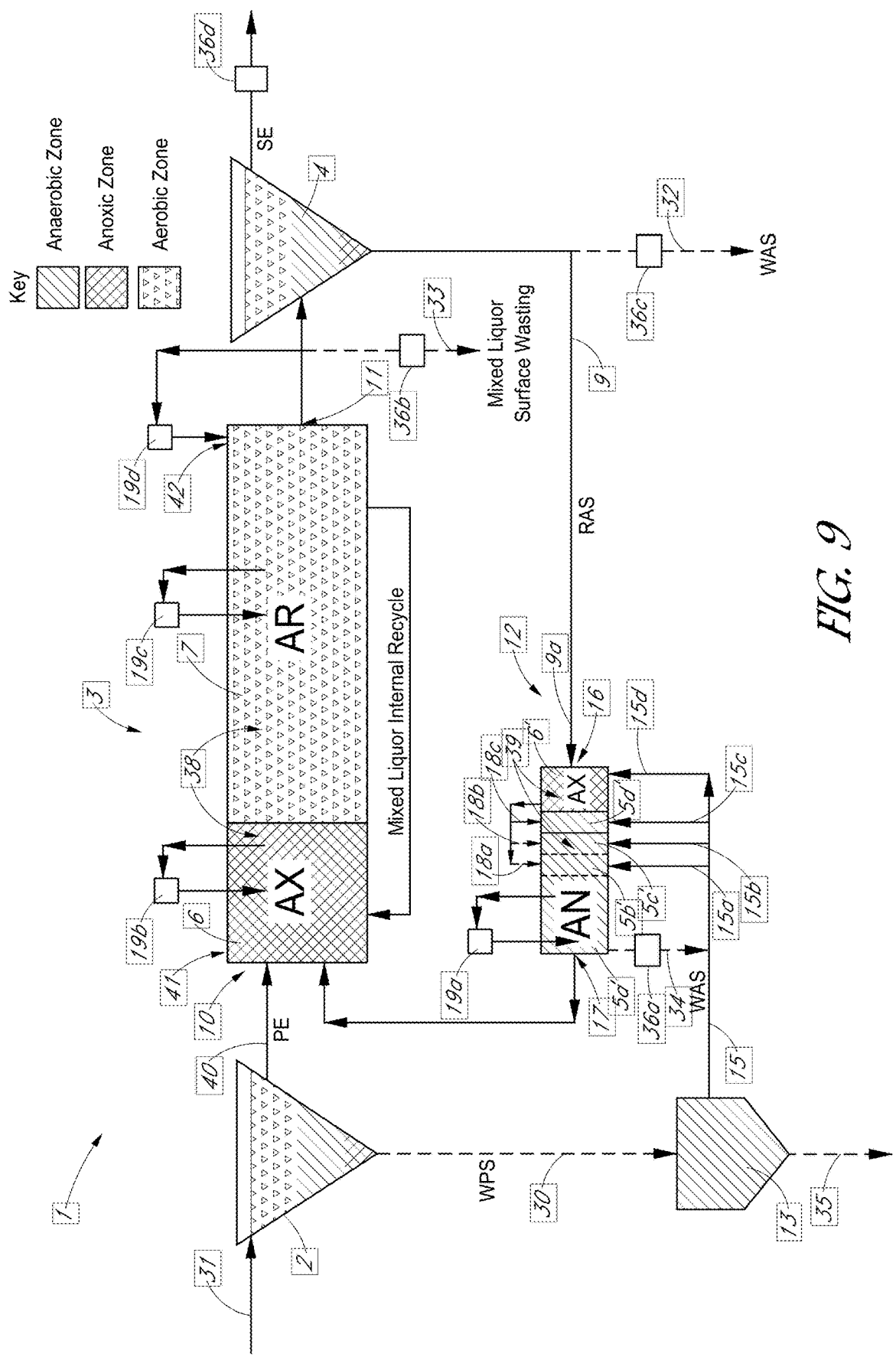
FIG. 9 is a system diagram showing the use of shear at various locations in the system, according to various embodiments.

FIG. 9 shows the use of one or more granule enhancing devices 19a-19d that can include various types of mixing and/or shearing devices (such as hydrocyclones, mixers, etc). Unless otherwise noted, the components of FIG. 9 may be the same as or generally similar to like-numbered components of FIGS. 4-8. In FIG. 9, there is no bypass pathway 9b of RAS, in which RAS is diverted around the sidestream incubator 12. In other embodiments, however, there may be a bypass pathway 9b as explained above in connection with FIGS. 8-9. Furthermore, in FIG. 9, one or more granule enhancing devices 19a-19d are shown in four locations but more or fewer devices may be located as desired. Sludge can be drawn from the tanks to which the shearing devices 19a-19d are connected, can pass through the mixing or shearing devices 19a-19d, and can be recirculated into the tank. It should be appreciated that devices may additionally or alternatively be provided on the anoxic zone 6' and/or on any of the other sub-zones as necessary and beneficial. In some embodiments, the devices 19a-19d can comprise a hydrocyclone. In some embodiments, the devices 19a-19d can comprise a mixing device. Examples of hydrocyclones may be found in U.S. Pat. No. 9,670,083, the entire contents of which are incorporated by reference herein in their entirety and for all purposes.

The granule enhancing devices 19a-19d (e.g., mixing and/or shearing devices) can serve various purposes, including enhancing the agglomeration of granules rich in EPS by bringing granules into regular contact with each other (for example, using a mixing device), which can improve the efficiency of granule formation. Such mixing devices are shown in the feast and famine zones (device 19a in the sidestream reactor 12 and device 19d in or after the famine zone in the mainstream circuit 3) where the microorganisms express elevated EPS production. The granule enhancing devices 19a-19d (e.g., mixing and/or shearing devices) can also induce additional forces on the granule surface to prevent filamentous or flocculant organisms from attaching to the granule or to remove debris and unwanted organisms from the granule surface, thus preventing blockage of the granule pores thereby improving granule integrity. For example, the granule enhancing devices 19b, 19c can comprise hydrocyclones or other types of granule enhancing device that removes debris from (or prevents attachment of flocculent organisms to) the granules at a locations within the processing zone 38.

As shown in FIGS. 6-9, selective granule retention devices 36a-36d may be provided to selectively retain the denser, faster settling granules once formed and to selectively waste out the flocculent slower settling biomass from the system. In some embodiments, the selective granule retention device may comprise a hydrocyclone, lamella plate(s), high rate settler, airlift pump, inclined plate or tube settler or any other suitable devices. In some embodiments, the selective granule retention device may be located on the waste activated sludge stream to recover any granules that may otherwise be wasted from the system as shown in FIGS. 6-9. In some embodiments, the selective granule retention devices 36a-36d may be located on the surface wasting stream to recover any granules that may otherwise be removed from the system. The selective granule retention devices 36a-36d may also be equipped with features to selectively waste slower settling biomass from the system such as fine bubble aeration to float the lighter flocculent material.

Figure 10:
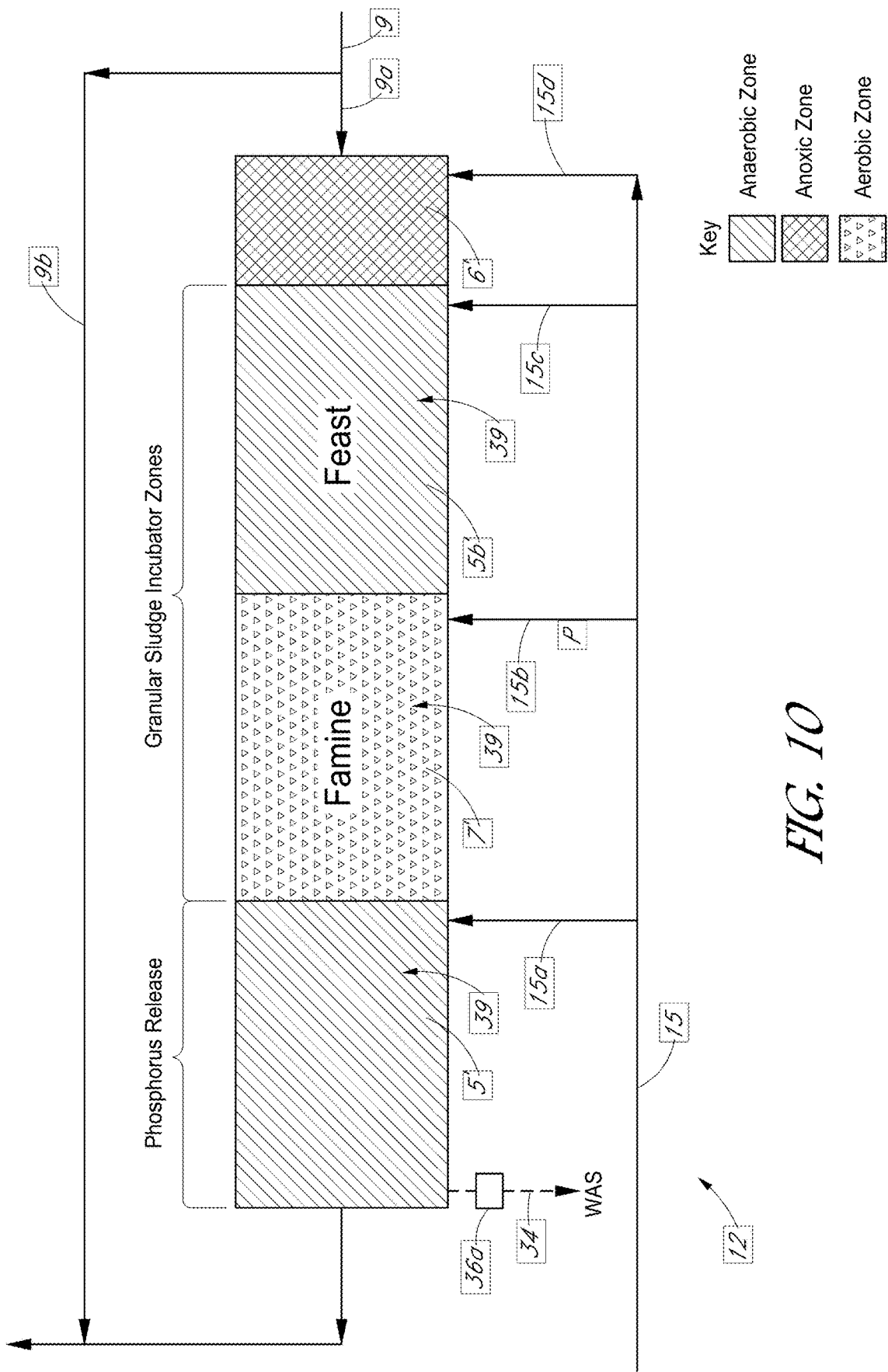
FIG. 10 is a detailed diagram of the sidestream reactor of a variant of the embodiment of FIG. 7.

FIG. 10 shows the sidestream RAS reactor 12 configured as a granule incubator with a high rate feast and famine zone, according to various embodiments. The sidestream reactor 12 can be used in conjunction with any of the embodiments disclosed herein. Unless otherwise noted, the components of FIG. 10 may be the same as or generally similar to like-numbered components of FIGS. 4-9. Unlike the embodiments illustrated above, the sidestream reactor 12 can include a sidestream aerobic zone 7' between sidestream anaerobic zones 5a', 5b'. For example, as shown in FIG. 10, the sidestream anoxic zone 6' can be positioned upstream of sidestream anaerobic sub-zone 5b' (which can serve as a feast zone), which can be positioned upstream of the sidestream aerobic zone 7' (which can serve as a famine zone). The sidestream aerobic zone 7' can be positioned upstream of the sidestream anaerobic sub-zone 5a'.

In FIG. 10, the anaerobic sub-zone 5b' and the aerobic zone 7' can serve as the granular sludge incubator zones. In some embodiments, a phosphorus-rich stream P (e.g., centrate or filtrate) can be supplied to the aerobic zone 7' along supply line 15b to drive the growth of granules. The anaerobic sub-zone 5a' downstream of the aerobic zone 7' along with the addition of a concentrated source of rbCOD (e.g. fermentate) can cause the phosphorus to be released and removed from the system as WAS 34 and can provide the EBPR organisms with the stored carbon used for subsequent phosphorus removal in the mainstream circuit 3.

Figure 11:
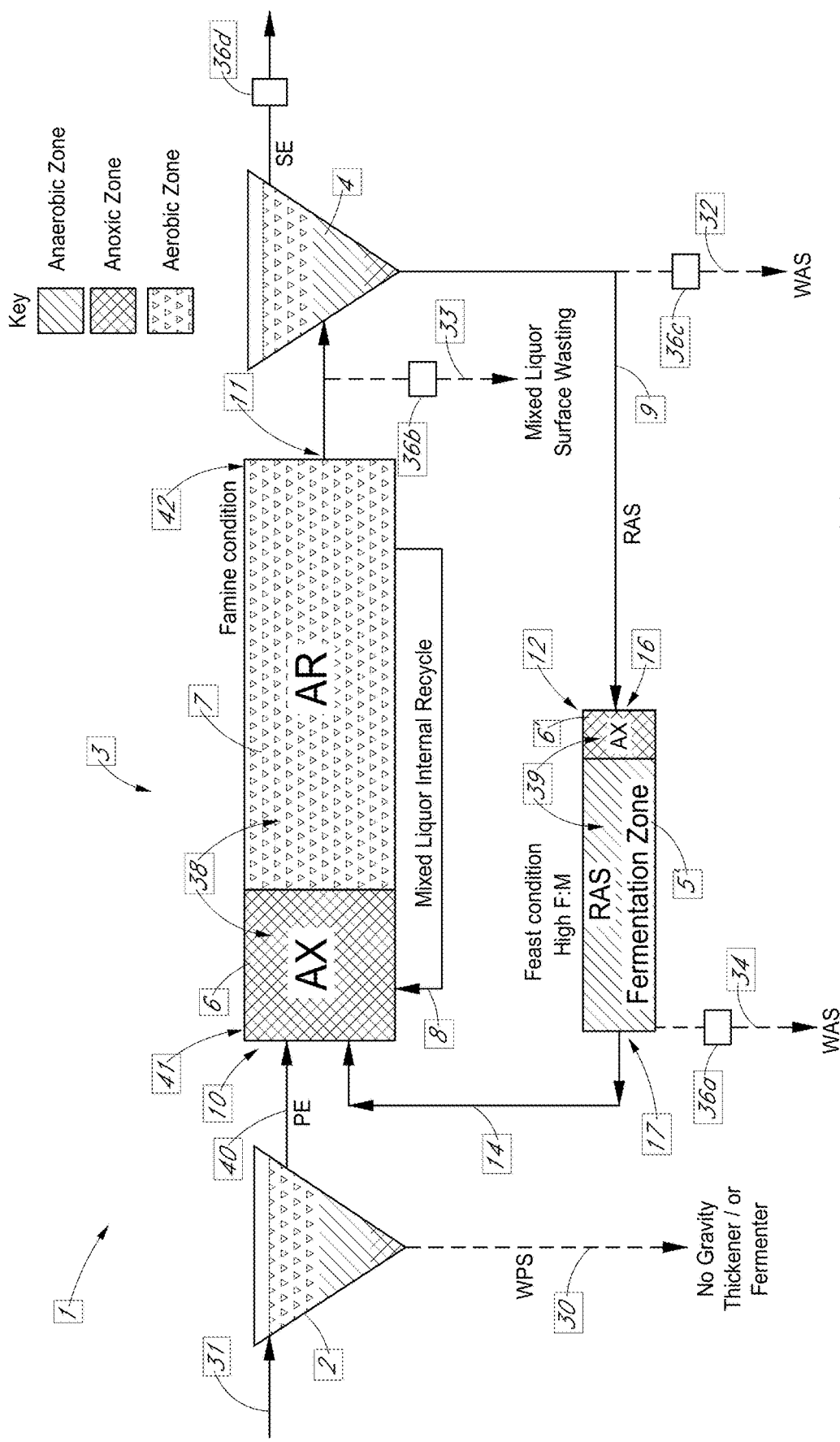
FIG. 11 is a system diagram illustrating the use of RAS fermentation as an readily biodegradable carbon (rbCOD) substrate source within the sidestream reactor, rather than in a separate fermenter or imported rbCOD substrate, according to various embodiments.

FIG. 11 shows the use of an enlarged RAS sidestream anaerobic zone 5' to provide in situ fermentation as an alternate means of generating rbCOD or VFA. Unless otherwise noted, the components of FIG. 11 may be the same as or generally similar to like-numbered components of FIGS. 4-10. Unlike the embodiments of FIGS. 6-10, in FIG. 11, there may be no primary clarifiers 2, nor WPS processing device 13, such that there may be no gravity thickener or fermenter to process WPS from the primary clarifiers 2. To compensate for the lack of an onsite rbCOD or VFA substrate generating source, the sidestream reactor 12 may include a larger tank for the sidestream anaerobic zone 5' to facilitate fermentation of the RAS stream itself. By enlarging the sidestream anaerobic zone 5', the system 1 can enable fermentation within the sidestream reactor 12 using only the RAS provided by the RAS return line 9.

In some embodiments, most of all of the RAS may be fed to the sidestream reactor 12. In such embodiments, the increased tank volume can increase the hydraulic retention time (HRT). For example, in some embodiments, the HRT may be at least 8 hours, at least 9 hours, at least 10 hours, at least 11 hours, at least 12 hours, at least 15 hours, or at least 20 hours. In some embodiments, the HRT may be in a range of 8 hours to 150 hours, in a range of 8 hours to 100 hours, in a range of 8 hours to 80 hours, in a range of 8 hours to 72 hours, in a range of 8 hours to 60 hours, in a range of 8 hours to 48 hours, in a range of 8 hours to 30 hours, or in a range of 8 hours to 24 hours. In various embodiments, the HRT may be in a range of 15 hours to 150 hours, in a range of 15 hours to 100 hours, in a range of 15 hours to 80 hours, in a range of 15 hours to 72 hours, in a range of 15 hours to 60 hours, in a range of 15 hours to 48 hours, in a range of 15 hours to 30 hours, or in a range of 15 hours to 24 hours.

The portion of RAS supplied to the sidestream reactor 12 and used for fermentation can be at least 4% of the total RAS, at least 10% of the total RAS, or at least 20% of the total RAS. For example, the portion of RAS supplied to the sidestream reactor 12 and used for fermentation can be in a range of 4% to 100%, in a range of 10% to 100%, in a range of 4% to 35%, in a range of 4% to 25%, in a range of 4% to 20%, or in a range of 20% to 100%.

In some embodiments, only a portion of the RAS may be used for fermentation in the sidestream reactor 12 for the embodiment of FIG. 11. For example, in some embodiments, there may be a bypass line such as the bypass line 9b shown here. In the embodiment of FIG. 11, however there may be no bypass line to bypass RAS around the sidestream reactor 12. For example, in various embodiments, only 10% of the RAS (e.g., 5% to 20%) can be fermented which can reduce the relative volume of the system to a lower HRT, e.g., an HRT in a range of 1 hr to 10 hrs, 1 hr to 5 hrs, 1 hr to 3.5 hrs, for example 2.4 hr HRT in one embodiment. In the illustrated embodiment, there is no RAS bypass line. In other embodiments, however, a second portion of the RAS may be diverted around the reactor 12 through a bypass line.

Figure 12:
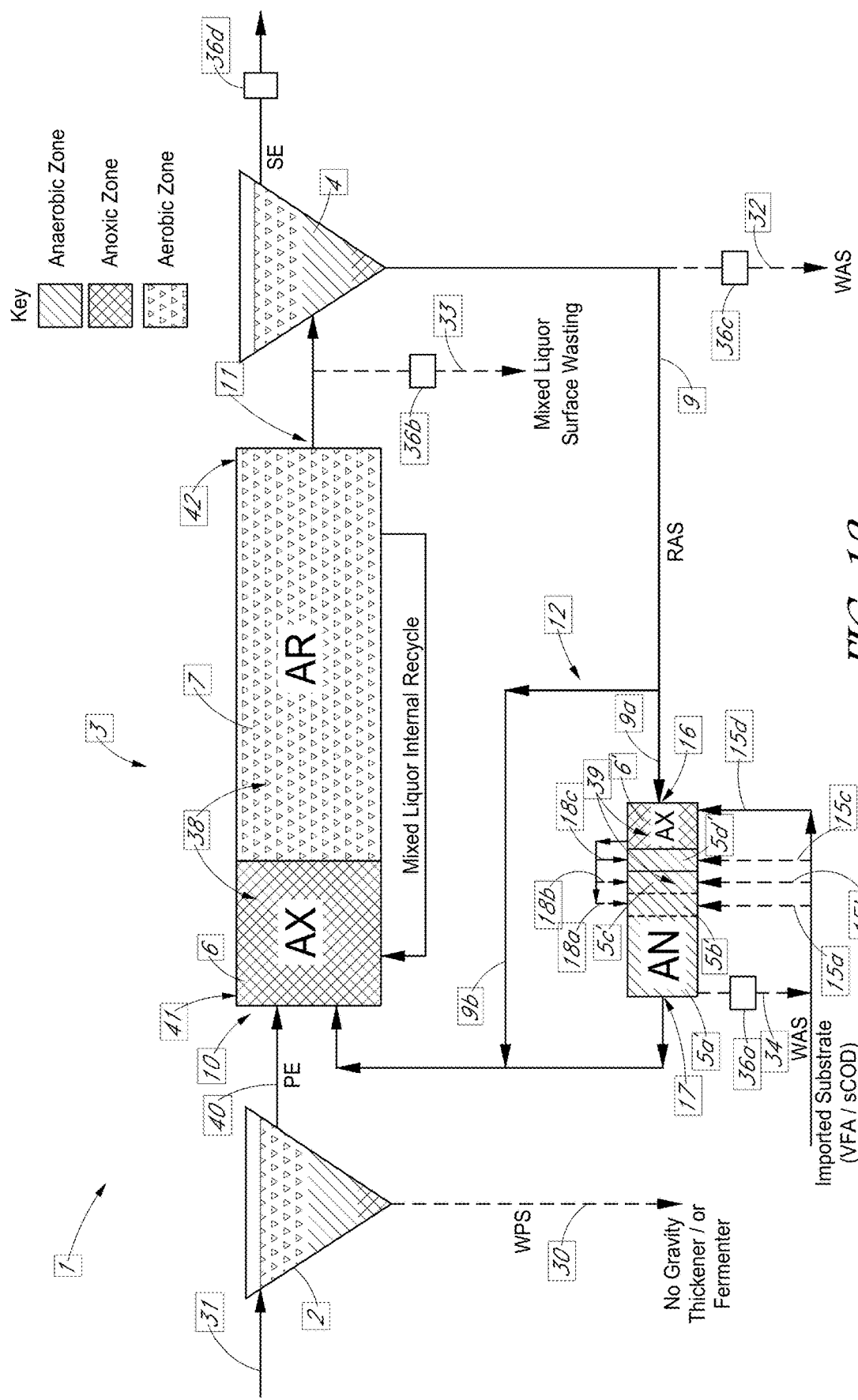
FIG. 12 is a system diagram illustrating the use of "imported substrates" as an rbCOD rich substrate source, according to various embodiments.

FIG. 12 illustrates another embodiment where at least some of the fermentate (e.g., rbCOD or VFA) is sourced from imported carbon rich, high strength waste streams such as fermented Fats, Oils, and Grease (FOG), food waste, molasses, sugary wastes etc. or commercial carbon rich liquids and/or byproducts such as acetic acid, or other organic chemicals. Unless otherwise noted, the components of FIG. 11 may be the same as or generally similar to like-numbered components of FIGS. 4-11. For example, as with the embodiment of FIG. 11, the system 1 of FIG. 12 does not include primary clarifiers 2 nor a WPS processing device 13 such as a gravity thickener or fermenter. To enhance fermentation and improve processing efficiencies in the sidestream reactor 12, substrate can be imported from other sources, e.g., "imported VFA substrate such as acetic acid." As with the embodiment of FIG. 8, in FIG. 12, the imported substrate can be step-fed to the respective anaerobic sub-zones 5a'-5d' and to the anoxic zone 6' by way of the supply lines 15a-15c. The imported substrate can be sourced in any suitable manner, including, for example, from external systems or entities.

Figure 13A:
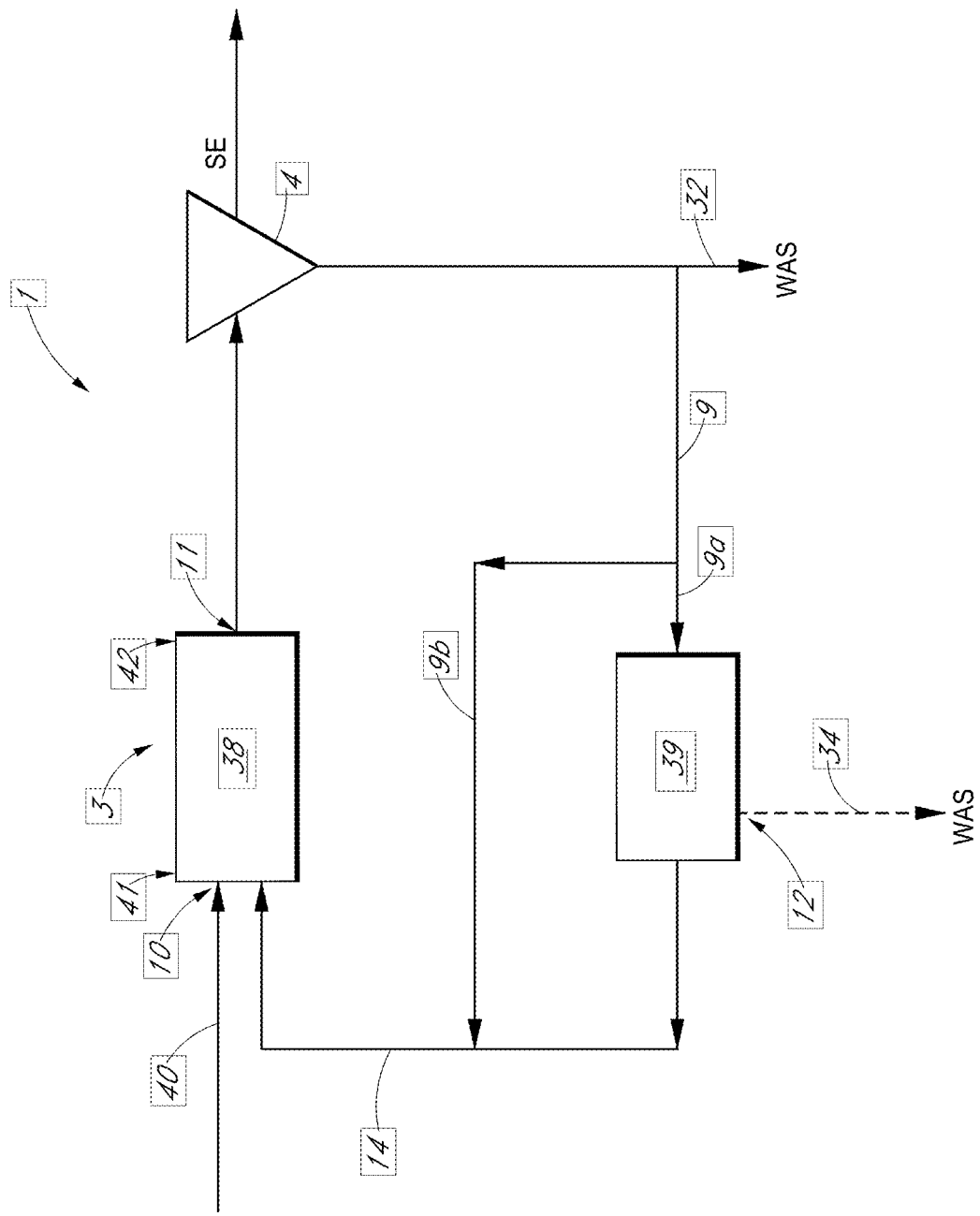
FIG. 13A is a system diagram illustrating a sidestream reactor that includes a RAS bypass line, according to various embodiments.

FIG. 13A is a system diagram illustrating a system 1 including a sidestream reactor 12 that includes a RAS bypass line, according to various embodiments. Unless otherwise noted, the components of FIG. 13A may be the same as or generally similar to like-numbered components of FIGS. 1-12. As explained above, various embodiments disclosed herein include the influent line 40 that supplies influent liquid (e.g., raw wastewater, PE, etc.) to the entry zone of the mainstream processing circuit 3. The processing zone 38 of the main processing circuit 3 can include any suitable combination of one or more processing zones configured to treat the influent liquid. In various embodiments, the processing zone 38 can include anoxic zone(s) (such as anoxic entry zone 6), aerobic zone(s) (such as aerobic exit zone 7), and/or anaerobic zone(s). Any suitable combination of one or more processing zones can be provided along the mainstream processing circuit 3.

As explained above, a first portion of the RAS can be provided to the sidestream reactor 12 along the first line 9a, and a second portion of the RAS can bypass the sidestream reactor 12 and be returned to the entry zone 41 of the mainstream circuit 3. It should be appreciated that the sidestream processing zone 39 can include any suitable combination of processing zones configured to process the RAS. In various embodiments, the sidestream processing zone includes upstream anoxic zone 6' and one or more of a downstream anaerobic zone(s) 5' and aerobic zone(s) 7'. The order of the various anoxic, anaerobic, and aerobic zones can vary in any suitable way. As shown in FIG. 13A, in some embodiments, the influent line 40 can convey raw wastewater to the mainstream circuit 3, without a primary clarifier 2. Moreover, there may not be a WPS processing device 13 in FIG. 13A. In other embodiments, as explained above, there may be a primary clarifier 2 and/or WPS processing device 13. Furthermore, the system 1 of FIG. 13A does not include a granule retention device (such as the granule retention devices 36a-36d) described above. In other embodiments, however, the system 1 can include one or more granule retention devices 36a-36d as shown above.

Figure 13B:
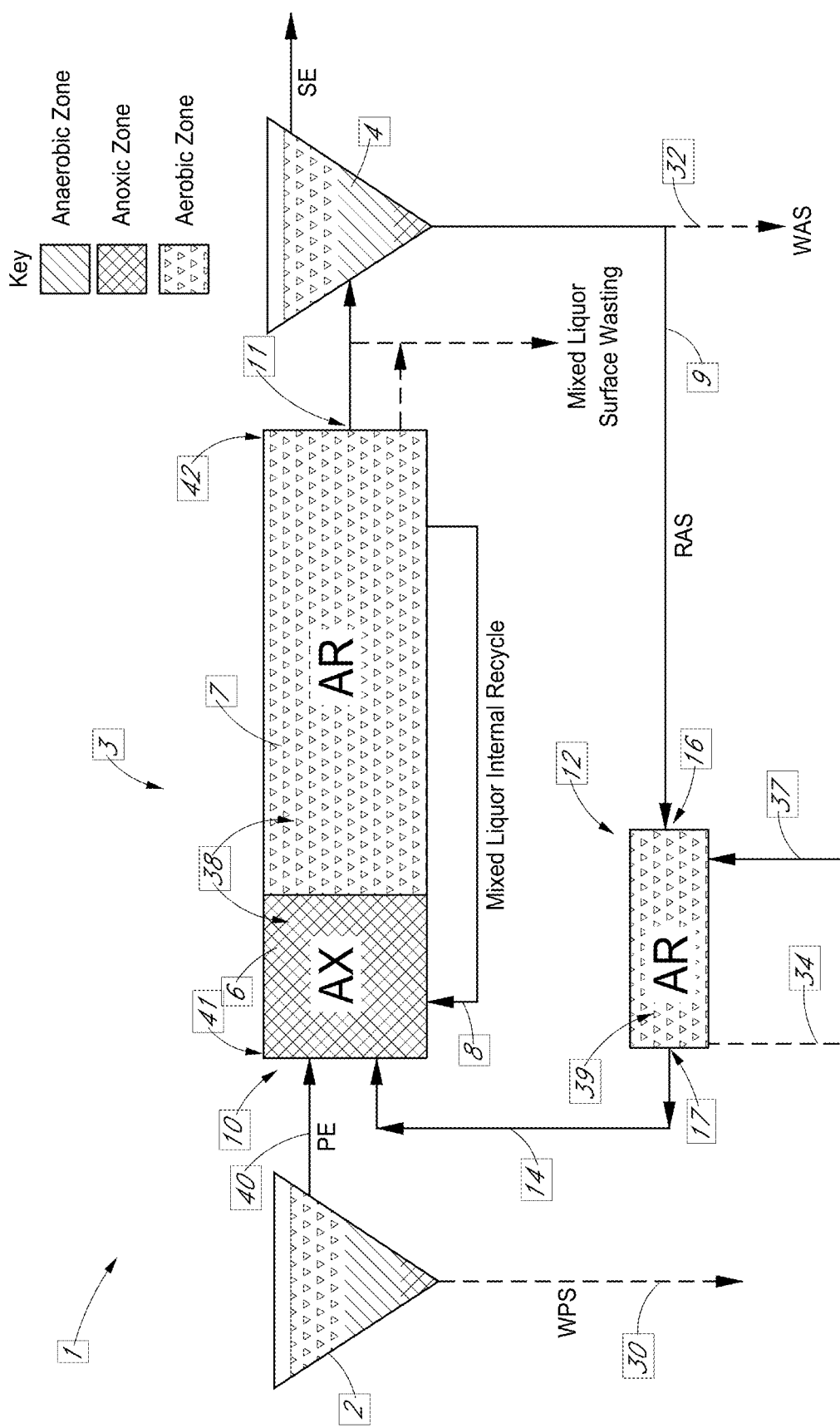
FIG. 13B is a system diagram illustrating a sidestream reactor that includes an aerobic processing zone, according to various embodiments.

FIG. 13B is a system diagram illustrating a sidestream reactor that includes an aerobic processing zone, according to various embodiments. Unless otherwise noted, the components of FIG. 13B may be the same as or generally similar to like-numbered components of FIGS. 1-13A. Unlike the embodiments illustrated above, the sidestream processing zone 39 of the sidestream reactor 12 can include only an aerobic zone 7' to process the RAS. In other embodiments, the sidestream processing zone 39 can include additional processing zones, such as one or more of a sidestream anoxic zone and a sidestream anaerobic zone.

Beneficially, the use of the aerobic zone 7' in the sidestream processing zone 39 can create granules in the sidestream reactor 12 by nitrifying microorganisms. For example, a nitrogen-rich supply line 37 can supply a nitrogen-rich stream of fluid (e.g., a fluid stream rich in ammonium) to the aerobic zone 7' of the sidestream reactor 12. The reaction of the nitrogen with the microorganisms can beneficially produce granules to be transferred to the main processing circuit 3. In the illustrated embodiment, moreover, there may be no WPS processing device 13 to supply carbon to the sidestream processing zone 39. In other embodiments, however, a WPS processing device can supply carbon to the sidestream processing zone 39, as shown in FIG. 6. Furthermore, the system 1 of FIG. 13B does not include a granule retention device (such as the granule retention devices 36a-36d) described above. In other embodiments, however, the system 1 can include one or more granule retention devices 36a-36d as shown above.

The embodiments disclosed herein can provide a number of benefits. For example, the system 1 shown in FIGS. 7 and 8 can enable the use of a smaller concentrated anaerobic zone, e.g., approximately a 33% overall reduction (e.g., a reduction in a range of 25% to 40%) in the system volume (e.g., the overall volume of the system 1) than current systems resulting in a lower cost and significantly smaller space or footprint demand. In addition, the embodiments of FIGS. 7-8, organics fermented to VFA in the fermenter can also provide processing at lower volume, cost, and space. The systems 1 of FIGS. 7-8 can provide a stable low oxygen reduction potential (ORP), with little or no Nitrate/Nitrite (NOx) or Dissolved Oxygen (DO) intrusion into the RAS anaerobic zone when operated with a pre-denitrification zone, which can result in more reliable performance. The embodiments of FIGS. 7-8 can provide for a more diverse and stable population of Phosphorus Accumulating Organisms. Moreover, the systems 1 of FIGS. 7-8 allow for the potential to granulate sludge so that it settles more efficiently with smaller clarifiers. The systems 1 of FIGS. 7-8 can enable compatibility with other wastewater treatment systems (e.g., WASSTRIP™ by Ostara Nutrient Recovery Technologies Inc. of Vancouver, British Columbia, Canada) to prevent struvite formation, enhance sludge dewaterability, as well as enhance phosphorus harvesting.

In the systems 1 and processes disclosed herein, step-feeding of the VFA and RAS in the sidestream reactor 12 can be used to improve or optimize the F:M ratio to enhance granule formation, for example, as shown in FIGS. 8-9. Another important aspect of the process is a "granule incubator" which employs multiple feast-famine cycles, as shown in FIG. 10. A dedicated, supplemental famine stage can be applied to part or all of the RAS immediately after the feast stage in the sidestream reactor 12 as shown in FIG. 10. To enhance this embodiment further, a concentrated phosphorus substrate source can be added to the dedicated famine zone to provide for rapid phosphorus uptake to enhance the formation of dense robust granules, through excessive EPS production. The source of the concentrated phosphorus can be provided by centrate and/or filtrate from anaerobically digested sludge dewatering, supernatant or other sources. Following the dedicated supplemental feast-famine formation zone, VFA can be added again in an anaerobic zone to encourage the EBPR organisms to release the soluble phosphorus again and allow for wasting of the OP that facilitates phosphorus recovery as shown in FIG. 10.

The embodiments disclosed herein can enhance granule integrity through rapid formation of granules under a repeated feast famine regime where the operation of the feast stage is controlled in the optimal elevated F:M condition. Moreover, granules can be subjected to mixing to enhance agglomeration of the microorganisms to accelerate the formation of granules and shear (using various mechanisms in both the sidestream and mainstream reactors) to enhance the integrity and robustness of the granule by preventing the attachment of filamentous or floc-forming microorganisms. Useful mixing and shear mechanisms and devices (such as the devices 19a-19d) include mixing, cyclonic action (see FIG. 9), air lift pumps and jet aeration.

Granule integrity can also be enhanced by minimizing or reducing carbon substrate, especially rbCOD, in the primary effluent so that when the granules are returned to the activated sludge system under an aerobic mode, the amount of organism growth and attachment to the granule surface is minimized. The mechanism to achieve carbon reduction in primary effluent can include chemically enhanced primary treatment (CEPT), "A-stage" contact stabilization type processes, physical screening/filtration processes and step-feeding the primary effluent to multiple zones.

Granule retention can be promoted by using internal mechanisms such as settling steps that retain the denser granules. These include surface wasting in one of the aerobic zones along with intermittent aeration to promote differential settling (by practicing surface wasting of the Mixed Liquor Suspended Solids (MLSS), the less dense flocculent material and organisms are preferentially wasted and granules are retained, final clarifier settling where the denser granules settle to the base of the clarifier and are returned in the RAS, and use of lamella plates or inclined plates or tube settlers ahead of the surface wasting location to enhance retention of the denser granules or on the wasted material to recover granules or combinations of the above. Of course, external selectors (lamella plates, tube settlers, cyclones, etc.) can also be applied to separate the dense granules from the less dense flocculent material.

A unique aspect of the continuous flow AGS (CFAGS) systems and methods described herein is the ability to provide a zone in the anaerobic RAS reactor where the F:M ratio is in the range of 0.2 g rbCOD/g VSS-d or greater and where the Hydraulic Residence Time (HRT) and Sludge Retention Time (SRT) can be controlled to the optimal period. Several key factors allow this flexibility.

First, providing a highly concentrated food or substrate can increase the F:M ratio. There are a number ways to provide a highly concentrated substrate including fermentation of the primary waste sludge (WPS) in a traditional gravity thickener or a specifically designed fermenter (e.g., the WPS processing device 13). Other approaches include the fermentation of the Return Activated Sludge itself for extended periods in the sidestream RAS anaerobic reactor as shown in FIG. 11. Alternate external concentrated substrates (such as the imported substrates of FIG. 12) can also be used including commercially available substrates such as acetic acid and rbCOD rich waste streams such as molasses, or high sugar streams such as waste streams from beverage bottlers or food processors. When the concentrated substrate is directed to the sidestream RAS reactor 12, it can support RAS denitrification to eliminate any residual nitrates, and thus create a deep anaerobic zone with very low Oxidation Reduction Potential (ORP), which is beneficial for the growth of Phosphorus Accumulating Organisms (PAOs) and denitrifying PAOs (dPAOs), that are the desired dominant organisms for dense granule formation and process performance.

In addition, fermentate or Gravity Thickener Overflow (GTO) can also contain fermenting organisms that help to ferment any remaining colloidal or particulate carbon sources (substrate) thus enhancing substrate availability in the RAS anaerobic zone 5' and minimizing dendritic growth on the granules or the growth of floc-forming organisms in the later aerobic stages of treatment. Studies have also shown that competitive organisms such as Glycogen Accumulating Organisms (GAOs) are less prevalent in sidestream RAS systems, such as that disclosed herein, than in conventional Enhanced Biological Phosphorus Removal systems, such as A2O (FIG. 4) and Bardenpho type processes (FIG. 5). Thus, the disclosed embodiments offer an advantage for granule formation and retention, as granules formed with fewer GAOs and more PAOs or dPAOs are denser and settle more rapidly than those formed with a greater amount of GAOs. The sidestream reactor 12 can beneficially select for a more diverse PAO population including dPAOs.

Further, a highly concentrated microorganism environment can be provided with the granules being formed in a separate or sidestream reactor 12 where the concentrated RAS is blended with the concentrated rbCOD or VFA substrate. This provides not only an advantage from the perspective of developing more robust granules but also results in a substantial reduction in reactor volume. The RAS in the disclosed embodiments can be approximately four times more concentrated than in the prior art proposed approaches where the RAS is blended with the dilute PE substrate in the mainstream activated sludge tank, as shown in FIGS. 4 and 5. The sidestream reactor 12 can provide these advantages while representing only about 7%-10% of the overall system volume for embodiments that include a separate thickener or fermenter such as the illustrated WPS processor 13 of FIGS. 6-9.

The F:M ratio in the feast stage can also be more effectively controlled by providing the flexibility to step-feed both the RAS and the concentrated rbCOD substrate (e.g., the fermentate from the WPS processing device 13) into the sidestream RAS anaerobic zones. Step-feeding RAS can be easily retrofitted into an existing flow-through treatment system to promote high F:M for the feast condition, and scavenge out remaining colloidal substrate in downstream anaerobic or anoxic zones to facilitate a subsequent famine condition and minimize growth of floc-forming organisms. In warmer climates, where substantial fermentation can take place in a treatment facility's collection system, step-feeding RAS into a series of main circuit anaerobic zones may also be easily installed and may be sufficient to establish the appropriate feast and famine conditions needed for dense, durable granule formation.

Both the Sludge Retention Time (SR) and Hydraulic Residence Time (HRT) can also be controlled using the RAS and substrate step-feed approach. Providing a longer SRT and HRT in the anaerobic zone where the F:M is improved for enhanced EPS production and robust granule formation can readily be controlled using the disclosed embodiments. An additional advantage of the disclosed embodiments is that the tank volume used to support the extended SRT and HRT conditions is much smaller than it would be if the traditional arrangements were used as shown in FIGS. 4 and 5, as noted above.

Testing has shown that not all the RAS needs to enter the sidestream RAS reactor 12 to support robust Enhanced Biological Phosphorus Removal (EBRP). Therefore, one can by-pass a portion of the RAS along bypass line 9b to allow a portion of the RAS to go directly to the main circuit 3 of the activated sludge reactor 1 or to downstream sidestream anaerobic reactor zones while the residual is directed to the first sidestream RAS reactor 12 for an extended detention time or to accommodate smaller tank volumes overall.

Granule size and stability can be enhanced by providing a highly concentrated aerobic Ortho-Phosphate zone immediately downstream of the highly concentrated RAS anaerobic/substrate uptake zone. This configuration promotes rapid granule formation. This can be provided by introduction of dewatering centrate or filtrate (e.g., the liquid extracted from the anaerobically digested sludge dewatering process), or other phosphorus rich stream into a granule incubator zone as shown in FIG. 10.

The disclosed embodiments are superior to those previously proposed systems, as prior processes rely on raw influent or primary effluent (PE) as the only substrate source. In such systems, PE contains a dilute source of desirable substrate (rbCOD), and enters into a dilute zone where the F:M ratio is typically in the range of 0.04 (rbCOD/VSS-d), which is lower than desired. Moreover, prior systems utilize a dilute environment that results in slower uptake and that is less conducive to granule formation. The typical F:M ratio in the first zone of a mainstream process is well below the desired 0.2 (rbCOD/VSS-d). In contrast, the disclosed embodiments can produce an aerobic granular sludge in a continuous flow-through treatment system (as opposed to a batch process) that promotes stronger and more plentiful granules with less flocculated biomass using smaller reactor volume. This approach is superior to the systems and processes of FIGS. 4 and 5.

The following claims are thus to be understood to include what is specifically illustrated and described above, what is conceptually equivalent, what can be obviously substituted and also what essentially incorporates the features and advantages described herein. Those skilled in the art will appreciate that various adaptations and modifications of the just described embodiments could be configured without departing from the scope of the invention. The illustrated embodiments have been set forth only for the purposes of example and that should not be taken as limiting the invention. For example, the skilled artisan will readily appreciate, in view of the teachings herein, that various features of the different embodiments can be mixed and matched, and the teachings are therefore not limited to the particular combinations of features shown in FIGS. 6-12. Therefore, it is to be understood that, within the scope of the appended claims, the invention may be practiced other than as specifically described herein.

What is claimed is:

1. A continuous flow granular sludge wastewater treatment system comprising:
   a main processing circuit comprising an entry zone, a processing zone, and an exit zone; and
   a continuous flow sidestream incubator for processing granular sludge comprising:
      an inlet that receives a first portion of return activated sludge (RAS) processed by the exit zone;
      a sidestream processing zone that processes the first portion of RAS;
      a plurality of supply lines, each supply line of the plurality of supply lines configured to receive a portion of a readily biodegradable carbon (rbCOD) rich substrate and to feed the portion of the rbCOD rich substrate to the sidestream processing zone;
      an outlet that delivers the processed first portion of RAS to the entry zone; and
      a RAS bypass pathway that bypasses the sidestream incubator to deliver a second portion of RAS to the entry zone.

2. The system of claim 1, wherein the main processing circuit comprises an aerobic processing zone.

3. The system of claim 2, wherein the mainstream processing circuit further comprises an anoxic entry zone and an aerobic exit zone.

4. The system of claim 1, wherein the sidestream processing zone comprises a sidestream anoxic zone and a sidestream anaerobic zone.

5. The system of claim 4, wherein the sidestream anoxic zone is upstream of the sidestream anaerobic zone.

6. The system of claim 4, wherein the sidestream anaerobic zone comprises a plurality of sidestream anaerobic zones in fluid communication with the sidestream anoxic zone, the sidestream anoxic zone and the plurality of sidestream anaerobic zones cooperating to process the RAS.

7. The system of claim 4, wherein the sidestream incubator further comprises a second inlet that receives a phosphorus-rich fluid stream, a sidestream anoxic zone, and a sidestream anaerobic zone, the sidestream anoxic zone and the sidestream anaerobic zone cooperating to process the RAS, the second inlet disposed upstream of the sidestream anaerobic zone.

8. The system of claim 1, wherein the sidestream processing zone comprises an aerobic zone.

9. The system of claim 8, further comprising a nitrogen-rich supply line to deliver a nitrogen-rich liquid stream to the aerobic zone.

10. The system of claim 1, wherein the second portion of RAS is greater than the first portion of RAS.

11. The system of claim 1, further comprising a granule enhancing device in fluid communication with the sidestream incubator, the granule enhancing device configured to mix or to apply shearing forces to the RAS to enhance granule formation.

12. The system of claim 11, wherein the granule enhancing device comprises a hydrocyclone device.

13. The system of claim 1, wherein each supply line of the plurality of supply lines receives imported rbCOD rich substrate to react with the RAS.

14. The system of claim 1, wherein each supply line of the plurality of supply lines receives a portion of a rbCOD rich substrate from a waste primary sludge processing device.

15. The system of claim 1, wherein the food-to-mass (F:M) ratio in the sidestream incubator is at least 0.15 (rbCOD/VSS-d).

16. The system of claim 1, further comprising:
a granule retention device fluidly connected downstream of one or more of the exit zone of the main processing circuit and at least a portion of the sidestream processing zone, the granule retention device configured to retain granules; and
a granule delivery line to deliver the retained granules to one or more of the entry zone and the sidestream incubator.

17. A method of manufacturing the system of claim 1, the method comprising retrofitting the sidestream incubator into an existing continuous flow wastewater treatment system.

18. A continuous flow granular sludge wastewater treatment system comprising:
a main processing circuit comprising an entry zone, a processing zone, and an exit zone;
a continuous flow sidestream incubator for processing granular sludge comprising:
an inlet that receives return activated sludge (RAS) processed by the exit zone;
a sidestream processing zone that processes the RAS; and
an outlet that delivers the processed RAS to the entry zone; and
a granule enhancing device in fluid communication with the sidestream incubator, the granule enhancing device configured to mix or to apply shearing forces to the RAS to enhance granule formation.

19. The system of claim 18, wherein the granule enhancing device comprises a shearing device.

20. The system of claim 19, wherein the shearing device comprises a hydrocyclone device.

21. The system of claim 18, wherein the granule enhancing device comprises a mixing device.

22. The system of claim 18, wherein the granule enhancing device is fluidly connected to a sidestream anaerobic zone of the sidestream incubator.

23. The system of claim 18, wherein the granule enhancing device is fluidly connected to one or more of an anoxic entry zone of the main processing circuit and an aerobic exit zone of the main processing circuit.

24. A continuous flow granular sludge wastewater treatment system comprising:
a main processing circuit comprising an entry zone, a processing zone, and an exit zone;
a continuous flow sidestream incubator for processing granular sludge comprising:
an inlet that receives return activated sludge (RAS) processed by the exit zone;
a sidestream anoxic zone and a plurality of sidestream anaerobic zones in fluid communication with the sidestream anoxic zone, the sidestream anoxic zone and the plurality of sidestream anaerobic zones cooperating to process the RAS;
a plurality of step pathways, each step pathway of the plurality of step pathways configured to receive a portion of the RAS from the sidestream anoxic zone and to feed the portion of the RAS to a sidestream anaerobic zone of the plurality of sidestream anaerobic zones; and
an outlet that delivers the processed RAS to the entry zone.

25. The system of claim 24, wherein the sidestream anoxic zone is upstream of the plurality of sidestream anaerobic zones.

26. The system of claim 24, further comprising a granule enhancing device in fluid communication with the sidestream incubator, the granule enhancing device configured to mix or to apply shearing forces to the RAS to enhance granule formation.

* * * * *